United States Patent
Cong et al.

(10) Patent No.: US 10,606,662 B2
(45) Date of Patent: Mar. 31, 2020

(54) SYSTEM AND METHOD FOR PROCESSING TASK RESOURCES

(71) Applicant: Alibaba Group Holding Limited, Grand Cayman (KY)

(72) Inventors: Lanlan Cong, Hangzhou (CN); Heshan Lin, Hangzhou (CN); Yehui Yang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 137 days.

(21) Appl. No.: 15/271,162

(22) Filed: Sep. 20, 2016

(65) Prior Publication Data

US 2017/0083381 A1    Mar. 23, 2017

(30) Foreign Application Priority Data

Sep. 21, 2015  (CN) .......................... 2015 1 0604095

(51) Int. Cl.
*G06F 9/455*    (2018.01)
*G06F 9/50*    (2006.01)

(52) U.S. Cl.
CPC .......... *G06F 9/5083* (2013.01); *G06F 9/5005* (2013.01); *G06F 9/5066* (2013.01); *G06F 9/5077* (2013.01); *G06F 2209/501* (2013.01)

(58) Field of Classification Search
None
See application file for complete search history.

(56) References Cited

U.S. PATENT DOCUMENTS

| | | |
|---|---|---|
| 8,261,268 B1 | 9/2012 | Forgette |
| 8,447,851 B1 | 5/2013 | Anderson et al. |
| 8,813,225 B1 | 8/2014 | Fuller et al. |
| 8,856,339 B2 | 10/2014 | Mestery et al. |

(Continued)

OTHER PUBLICATIONS

International Search Report and Written Opinion to corresponding International Application No. PCT/US2016/052740 dated Dec. 9, 2016.

(Continued)

*Primary Examiner* — Dong U Kim
(74) *Attorney, Agent, or Firm* — James J. DeCarlo; Greenberg Traurig, LLP

(57) ABSTRACT

A device and method for automatically allocating computing resources is disclosed herein. The method includes receiving a task from a client, the task including a plurality of instances and a resource description manifest representing resource needs of the plurality of instances; determining an initial computing resource allocation of a cluster of machines based on the resource description manifest, wherein the initial computing resource allocation is determined based on the resource needs included in the resource description manifest; determining that the resource description manifest indicates a request to utilize an actual computing resource allocation in excess of the initial computing resource allocation; configuring a plurality of actual computing resources to process the plurality of instances, wherein the plurality of actual computing resources are configured to utilize resources in excess of the initial computing resource allocation; and executing the plurality of instances using the plurality of actual computing resources.

20 Claims, 13 Drawing Sheets

(56) References Cited

U.S. PATENT DOCUMENTS

| | | |
|---|---|---|
| 8,886,777 B2 | 11/2014 | Salsburg |
| 8,943,203 B1 | 1/2015 | Lent et al. |
| 8,978,035 B2 | 3/2015 | McGrath et al. |
| 8,996,695 B2 | 3/2015 | Anderson et al. |
| 9,015,709 B2 | 4/2015 | Voccio |
| 9,032,081 B1 | 5/2015 | North et al. |
| 9,104,492 B2 | 8/2015 | Gember et al. |
| 9,268,586 B2 | 2/2016 | Voccio et al. |
| 9,300,553 B2 | 3/2016 | Dube et al. |
| 9,389,894 B1* | 7/2016 | Zhang ................. G06F 9/45558 |
| 9,438,466 B1* | 9/2016 | O'Gorman ........ H04L 29/08072 |
| 2011/0078303 A1 | 3/2011 | Li et al. |
| 2012/0060171 A1 | 3/2012 | Bobroff et al. |
| 2012/0124194 A1 | 5/2012 | Shouraboura |
| 2012/0233282 A1 | 9/2012 | Voccio et al. |
| 2013/0080814 A1* | 3/2013 | Cong ................... G06F 1/3206 713/340 |
| 2013/0111468 A1* | 5/2013 | Davis ................... G06F 9/5077 718/1 |
| 2014/0058871 A1* | 2/2014 | Marr .................. G06F 9/45533 705/26.1 |
| 2014/0075029 A1 | 3/2014 | Lipchuk et al. |
| 2014/0331235 A1* | 11/2014 | Lee ....................... G06F 9/5027 718/104 |
| 2015/0022666 A1 | 1/2015 | Kay et al. |
| 2015/0193276 A1* | 7/2015 | Maclinovsky ......... G06Q 10/06 718/104 |
| 2015/0195164 A1 | 7/2015 | Klein |
| 2015/0234682 A1 | 8/2015 | Dageville et al. |
| 2015/0365311 A1 | 12/2015 | Klein |
| 2016/0048408 A1 | 2/2016 | Madhu et al. |
| 2016/0105350 A1* | 4/2016 | Greifeneder .......... H04L 41/046 709/224 |
| 2016/0197843 A1 | 7/2016 | Palan et al. |
| 2017/0041379 A1* | 2/2017 | Zhu ..................... H04L 12/4641 |

OTHER PUBLICATIONS

Batch—Compute job scheduling service | Microsoft Azure, available at http://web.archive.org/web/20150918080326/http://azure.microsoft.com/en-us/services/batch/? (Sep. 18, 2015).

Ghanbari et al., "Exploring Alternative Approaches to Implement an Elasticity Policy," Cloud Computing (Cloud), 2011 IEEE International Conference ON, IEEE, pp. 716-723 (2011).

Supplemental European Search Report to corresponding EP Application No. 16849452 dated Apr. 11, 2019 (10 pages).

* cited by examiner

SYSTEM AND METHOD FOR PROCESSING TASK RESOURCES

CROSS-REFERENCE TO RELATED APPLICATIONS

This application claims the benefit of priority from Chinese Patent Application No. 201510604095.2, filed on Sep. 21, 2015, entitled "Resource Distribution Method for Processing Task, Apparatus and System of Same," which is incorporated herein by reference in its entirety.

BACKGROUND

Field of the Disclosure

The present application relates generally to the field of cloud computing and, specifically, to the optimization of task processing in a heterogeneous cloud computing environment.

Description of Related Art

In the prior art, batch computing services are distributed cloud services utilized for processing massively parallel batch processing jobs. These services are used relatively widely in the fields of film and animation rendering, biological data analysis, multimedia transcoding, finance, insurance analysis, and similar fields requiring high volume, parallel computing.

Users of batch computing services may define a specific computing need as a job, with a job containing multiple independent or dependent tasks. Furthermore, each task may have one or more execution instances and may specify a running program address, an input/output path (i.e., an input/output address of the data required for running a program), resource needs (CPU and memory), and concurrency needs (e.g., specifying the quantity of instances contained in each task).

In batch computing models, even though one may be dealing with massive concurrency scenarios (e.g., concurrency node levels in the hundreds or thousands), users' descriptions of resources are generally homogenous (e.g., single resource descriptions, that is, all instances of each task use computing resources with the same configuration), and it is difficult to adapt to heterogeneous massive cloud computing resources.

In the process of constructing a cloud computing resource, factors such as cost considerations, reuse of old equipment, different purchase batches, etc., often result in a large number of heterogeneous computing resources (including inconsistent machine models, CPUs, memory, and the like) being used to provide cloud computing services. When heterogeneous computing resources are used for massively parallel batch computing, generally only single resource specifications (including the number of CPU cores and memory size) can be used to allocate computing resources, which can cause computing resources to be underutilized.

For example, consider a heterogeneous cloud computing cluster that includes 100 16-core, 100 24-core, 100 32-core, and 100 48-core CPU computing resources. When a user executes a job on this cluster, generally only 14-core CPUs may be specified for each instance (the other two cores being reserved for system overhead) because higher configuration resources, such as 24-core, 32-core or 48-core CPUs, may cause greater waste. That is, a user may choose to use a 14-core CPU for each instance in order to use as many computing nodes as possible, as explained below.

For example, all 400 computing resources may be used if the user uses 14-core CPUs for computing, since larger capacity resources are capable of handling the user's 14-core request. Conversely, only 200 computing resources can be used if the user uses 30-core CPUs for computing (e.g., only the 100 32-core resources and 100 48-core resources). Additionally, if the user requests 14-core CPUs for computing, when a user's job is executed, no matter what the actual configuration of the computing resources is, only the 14 cores of the CPUs can be called for executing the user's job, and the other resources (e.g., cores) will be idle.

In order to solve this problem in the prior art, two possible prior art methods have been implemented. In a first method, a user is asked to split a single job or task into multiple different jobs or tasks, respectively, and different resource needs are defined for each split job or task to adapt to the heterogeneous cloud computing resource. In a second method, support for multiple virtual machines is added to the heterogeneous cloud computing resource in order to improve the resource utilization ratio. Both attempt to solve, to a certain extent, the problem of underutilization of the heterogeneous cloud computing resources, but they both have the significant deficiencies.

In the first method, the user is required to split jobs according to different resource needs, which is relatively difficult in practice. This is because the specific allocation of heterogeneous cloud computing resources is invisible to the user, so the user is unable to know how many resources can be allocated to computing resources (e.g., above 14-cores, above 22-cores etc.). Therefore, this method is significantly complex, low in operating efficiency, and unfriendly to the user.

In the second method, support for multiple virtual machines is added. This method may better improve the utilization ratio of the heterogeneous cloud computing resources, but can only support a limited number of specific user scenarios. For example, when a user's job is a network I/O-intensive job, supporting multiple virtual machines on a single physical machine may cause inefficient network competition between virtual machines and cause the decline of the overall performance in processing the user's job.

No effective solution has yet been put forward to address these problems in the prior art that when batch computing is conducted using heterogeneous cloud computing resources, the heterogeneous cloud computing resource is underutilized, which results in a low efficiency in processing tasks contained in a user's job.

BRIEF SUMMARY

According to some embodiments, the disclosure provides a scheduling method, device and system for processing task resources, to at least solve existing technical problems in the prior art, that when batch computing is conducted on a heterogeneous cloud computing resource, the heterogeneous cloud computing resource is underutilized, which results in a low efficiency in processing tasks contained in a user's job.

According to one embodiment, the disclosure describes a system for automatically allocating an actual computing resource in excess of an initial computing resource by a cloud computing resource. In one embodiment the method includes receiving a task from a client, the task including a plurality of instances and a resource description manifest representing resource needs of the plurality of instances; determining an initial computing resource allocation of a cluster of machines based on the resource description manifest, wherein the initial computing resource allocation is determined based on the resource needs included in the resource description manifest; determining that the resource description manifest indicates a request to utilize an actual computing resource allocation in excess of the initial computing resource allocation; configuring a plurality of actual computing resources to process the plurality of instances, wherein the plurality of actual computing resources are configured to utilize resources in excess of the initial computing resource allocation; and executing the plurality of instances using the plurality of actual computing resources.

According to one embodiment, the disclosure describes a system for automatically allocating actual computing resources in excess of an initial computing resource allocation by a cloud computing resource. In one embodiment the system includes one or more processors, a network interface, and a non-transitory memory storing computer-executable instructions executable by the one or more processors. The non-transitory memory may include instructions causing the system to receive a task from a client, the task including a plurality of instances and a resource description manifest representing resource needs of the plurality of instances; determine an initial computing resource allocation of a cluster of machines based on the resource description manifest, wherein the initial computing resource allocation is determined based on the resource needs included in the resource description manifest; determine that the resource description manifest indicates a request to utilize an actual computing resource allocation in excess of the initial computing resource allocation; configure a plurality of actual computing resources to process the plurality of instances, wherein the plurality of actual computing resources are configured to utilize resources in excess of the initial computing resource allocation; and execute the plurality of instances using the plurality of actual computing resources.

According to one embodiment, the disclosure describes a tangible, non-transitory computer-readable medium storing instructions that, when executed by a computing device coupled to the Internet, cause the computing device to receive a task from a client, the task including a plurality of instances and a resource description manifest representing resource needs of the plurality of instances; determine an initial computing resource allocation of a cluster of machines based on the resource description manifest, wherein the initial computing resource allocation is determined based on the resource needs included in the resource description manifest; determine that the resource description manifest indicates a request to utilize an actual computing resource allocation in excess of the initial computing resource allocation; configure a plurality of actual computing resources to process the plurality of instances, wherein the plurality of actual computing resources are configured to utilize resources in excess of the initial computing resource allocation; and execute the plurality of instances using the plurality of actual computing resources.

The solution of embodiments provided by the present application solves the technical problem that, in the prior art, when batch computing is conducted based on a heterogeneous cloud computing resource, the heterogeneous cloud computing resource is underutilized, which results in a low efficiency in processing tasks contained in a user's job.

BRIEF DESCRIPTION OF THE DRAWINGS

The accompanying drawings described herein are intended, when taken together with the following detailed description, to provide further understanding of the disclosure. The embodiments of the disclosure and the description thereof are intended for further explaining and clarifying the disclosure; the scope of the disclosure is not defined by the description or the accompanying drawings of any specific embodiments, but rather by the claims. The disclosure includes the following accompanying drawings.

DETAILED DESCRIPTION

Figure 1:
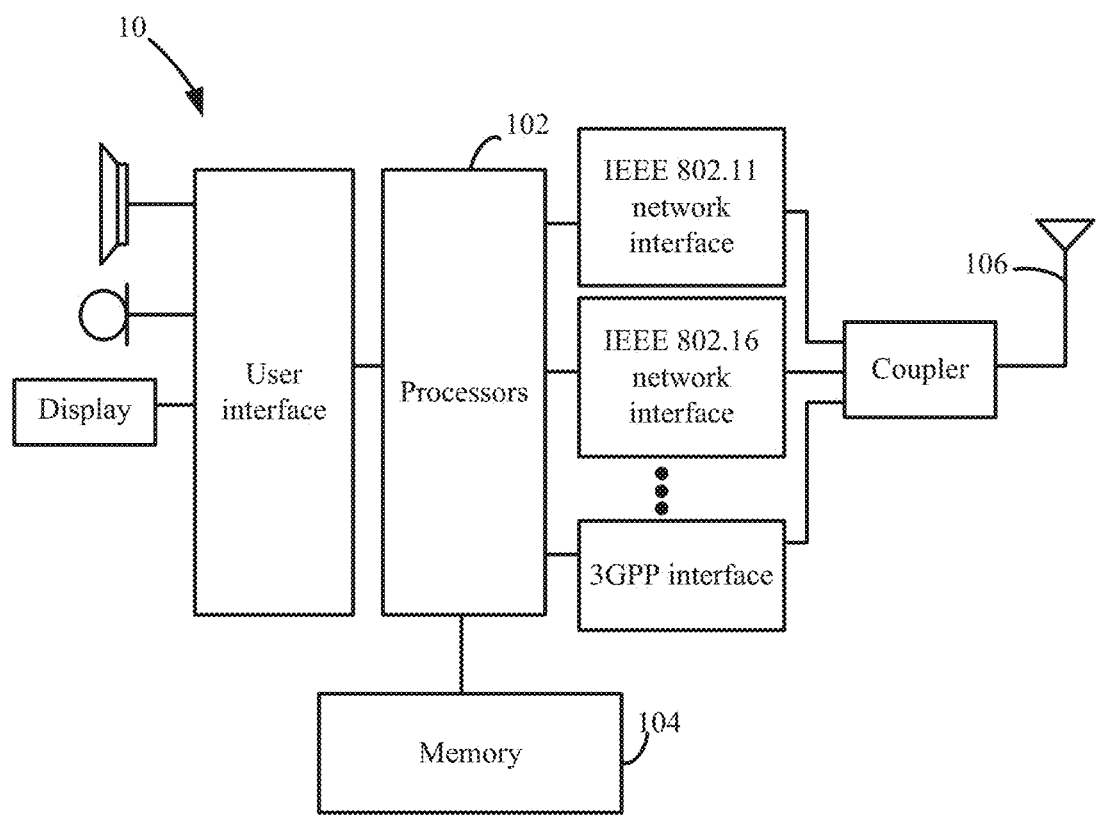
FIG. 1 is a block diagram of a computer terminal for practicing a scheduling method for processing task resources according to some embodiments of the disclosure.

To enable those skilled in the art to better understand the solutions of the present application, the following shall clearly and completely describe the technical solutions in the embodiments of the present application with reference to the accompanying drawings in the embodiments of the present application. It is clear that the described embodiments are only some, not all, of the possible embodiments of the present application. All other embodiments obtained by those of ordinary skill in the art based on the embodiments of the present application without additional creative effort shall fall within the protection scope of the present application.

It should be explained that in the specification, the claims and the accompanying drawings of the present application, terms (such as "a first" or "a second") are intended to separate between similar objects, but are not intended to describe a specific sequence or precedence order. It is to be understood that data used in this manner may be interchangeable where appropriate, so that the embodiments of the present application described herein may be realized in sequences excluding those illustrated or described herein. Furthermore, terms such as "comprise", "have" or other variants thereof are intended to cover a non-exclusive "comprise", for example, processes, methods, systems, products or devices comprising a series of steps or units are not limited to these steps or units listed explicitly, but rather comprise other steps or units not listed explicitly, or other steps or units inherent to these processes, methods, systems, products or devices.

First, some terms appearing in the embodiments of the disclosure are explained herein.

A "batch computing service" may refer to a distributed cloud service, applicable to massively parallel batch processing jobs that is capable of supporting massive job concurrency scales, where the system automatically controls resource management, job scheduling, and data loading, and charges users according to the actual use.

"Cloud computing" may refer to addition, usage, and delivery modes of Internet-based related services, generally involving the providing of dynamic, easily-extensible, and often virtualized resources through the Internet. The "cloud" is a metaphor for networks and, in particular, the Internet. Cloud computing generally employs a usage-based pricing model, providing available, convenient, and on-demand network access and resources (including network, server, storage, application software and service) that may be quickly provided by access to a configurable computing resource share pool, requiring few management inputs or few interactions with service providers.

A "CPU," or "central processing unit," may refer to a very large-scale integrated circuit, including a computing core and a control unit, and having a main function of executing computer instructions and processing data in computer software.

An "instance" may refer to a processing unit scheduled and executed by batch computing services. Each specific computing need of users in batch computing services is described as a job, each job being composed of a group of tasks and dependencies thereof; each task may contain one or more instances, and each instance of the same task may parallel process each input data.

FIG. 1 is a block diagram of a computer terminal used for executing a scheduling method for processing task resources, according to some embodiments of the disclosure. The terminal illustrated in FIG. 1 may comprise a mobile terminal, a desktop computer terminal, or a similar computing device.

As the embodiment of FIG. 1 illustrates, a computer terminal 10 may include one or more processors 102 (the processors 102 may include, but are not limited to processing units such as a microprocessor, a field programmable gate array, or the like), a memory device 104 configured to store data, and a transmitting module 106 providing communication functionality. Those of ordinary skill in the art may understand that the structure as shown in FIG. 1 is merely one embodiment, and is not intended to limit the structure of an electronic device. For example, the computer terminal 10 may further include more or less components than that shown in FIG. 1, or have a configuration different from that shown in FIG. 1.

The memory device 104 may be configured to store program instructions of application software and modules. For example, program instructions or modules corresponding to a scheduling method for processing task resources in the embodiments of the disclosure described herein. By running application software and modules stored in the memory device 104, the processors 102 may execute various applications and data processing tasks; such as, executing the scheduling method for processing task resources described herein. The memory device 104 may include a high-speed random access memory (RAM) device, or include a non-volatile memory device such as one or more magnetic memory devices, flash memory devices or other non-volatile solid state memory devices. In some embodiments, the memory device 104 may further include some memory devices disposed remotely relative to the processors 102, and these remote memory devices may be connected to the computer terminal 10 through a network. Examples of a network include, but are not limited to, the Internet, an intranet, a local area network (LAN), a mobile communication network, or a combination thereof.

The transmitting device 106 is configured to receive or send data through a network. The network may include a wireless network provided by a communication provider of the computer terminal 10. In an example, the transmitting device 106 includes a network interface controller (NIC), which may connect to other network devices by means of a base station to communicate with the Internet. In an example, the transmitting device 106 may be a radio frequency module, which is configured to communicate with the Internet wirelessly.

Figure 2:
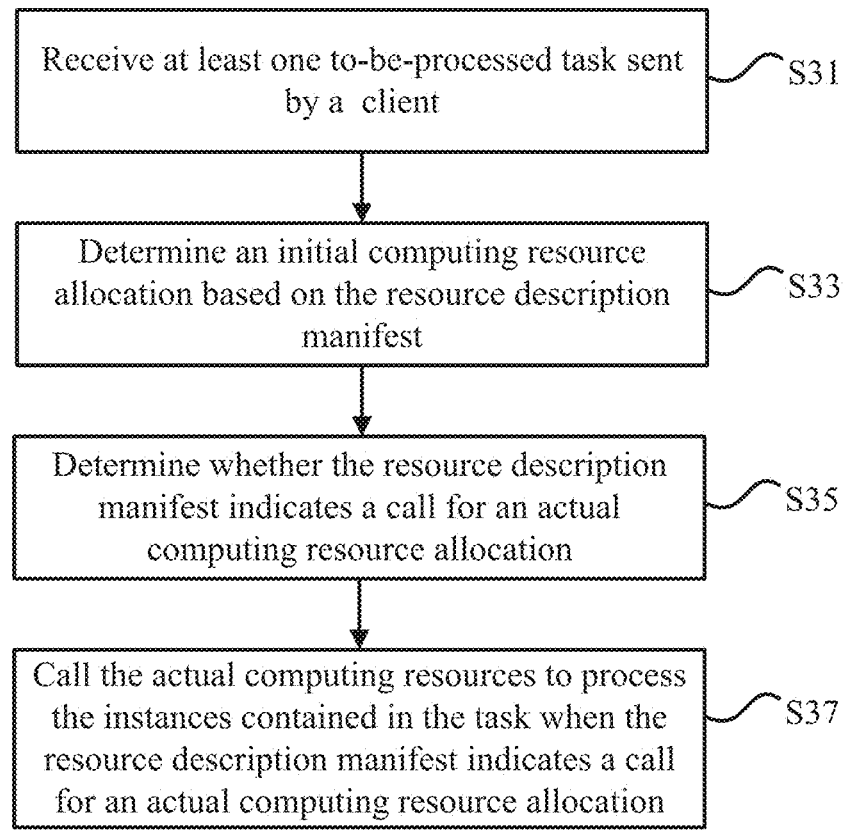
FIG. 2 is a schematic flow diagram of a scheduling method for processing task resources according to some embodiments of the disclosure.

FIG. 2 is a flow diagram of a scheduling method for processing task resources, according to some embodiments of the disclosure.

In step S31, the method receives at least one task sent by a client. A task may contain one or more instances as well as a resource description manifest required for processing the instances contained in the task. In one embodiment, an instance may comprise a minimum unit scheduled and executed by a batch computing service. Each specific computing need of users in batch computing services may be described as a job, with each job comprising a group of tasks and dependencies thereof. Likewise, each task may contain one or more instances, and each instance of the same task may parallel process data.

In accordance with some embodiments, the client may be a terminal as indicated above, or may be an application program installed on a computer, a tablet computer, a notebook computer, and the like. A user may generate a job by logging into the client and submitting the job according to a specific computing need. In one embodiment, a job contains at least one task, each task contains one or more instances, and each instance in each task calls the same computing resource, which may be described through the resource description manifest.

In accordance with some embodiments, the resource description manifest may include an address of a program run by a task, an input/output path of data required for the program run, resource needs (such as CPUs, memory, and the like), concurrency needs (namely, the quantity of instances contained in each task), and the like.

In one embodiment, the resource needs specified by the user in the resource description manifest includes resources used as system overhead. For example, when the user's resource need is an 8-core CPU, two cores may be used as the system overhead, and the remaining six cores may be used for processing the instances contained in user's job.

In step S33, the method determines an initial computing resource allocation according to the resource description manifest. The initial computing resource allocation represents the minimum computing resource requested for processing the instances contained in the task.

Specifically, after the task is received from the client, for any task therein, the cloud computing resource determines, according to the resource description manifest contained in the task, the initial computing resource allocation of the instances contained in the task. The initial computing resource allocation is the minimum computing resource satisfying the resource description manifest contained in the task.

In some embodiments, the cloud computing resource reads, from the resource description manifest contained in a task, configuration information of computing resources required for processing the instances contained in the task. Next, the cloud computing resource screens, according to the configuration information, the computing resource whose configuration conforms to the configuration information as the initial computing resource allocation.

In step S35, the method determines whether the resource description manifest indicates a request for utilizing an actual computing resource allocation. The actual computing resource allocation is a computing resource allocation in excess of the initial computing resource allocation.

Specifically, for any task among a plurality of tasks, after the initial computing resource allocation to process the task is determined according to the resource description manifest of the task, it is determined whether the resource description manifest indicates a request for utilizing the actual computing resource allocation greater than the initial computing resource allocation to process the task. The actual hardware configuration of the physical machine (for example, the number of CPU cores, memory, etc.) corresponding to the initial computing resource may be greater than the configuration of the initial computing resource. The actual computing resource and the initial computing resource correspond to the same physical machine, and the configuration of the actual computing resource may be higher than that of the initial computing resource, but is not in excess of the actual hardware configuration of the physical machine.

According to some embodiments, in order to improve the utilization ratio of the cloud computing resource, when the task is generated on the client, a user may specify whether the computing resource requested for processing the task can grow dynamically according to the actual configuration supported by the cloud computing resource. That is, the user may specify whether the actual resources occupied by the instances contained in the task may be greater than the computing resources specified by the user in the resource description manifest when the task is run.

According to some embodiments, after determining the initial computing resource configured to process the task according to the resource description manifest contained in the task, the cloud computing resource determines whether the resource description manifest indicates a request for the actual computing resource that can be supported by the physical machine corresponding to the initial computing resource to process the instances contained in the task.

Furthermore, in one embodiment, after determining the initial computing resource configured to process the task, the cloud computing resource determines whether the configuration information of the configuration item in the resource description manifest indicates a request for the actual computing resource greater than the user-specified resource needs when the task is executed, and calls, before the task is executed, the corresponding computing resource according to the configuration information of the configuration item.

In step S37, the method calls the actual computing resources to process the instances contained in the task when the resource description manifest indicates a request for an actual computing resource allocation. Specifically, the actual computing resource allocation in excess of the initial computing resource allocation is called to process the instances contained in the task when it is determined that the resource description manifest indicates a request for the actual computing resource.

According to some embodiments, after scheduling each instance contained in a task to the corresponding initial computing resource, the cloud computing resource automatically calls the actual computing resource in excess of the initial computing resource to run the instances contained in the task when the instances are executed if it is determined that the resource description manifest indicates a request for the actual computing resource. This avoids the problem in the prior art, namely, the wasting of cloud computing resources because the task is processed according to the user-specified resource needs. It additionally obviates the need for the user to manually split jobs according to different types of resource needs and allows automatic processing the task according to the actual configuration of the cloud computing resource. Thus, the automatic allocation of actual computing resources improves the utilization ratio of the cloud computing resource and further improving the efficiency in processing the tasks contained in the user's job.

The called actual computing resource may be flexibly adjusted according to needs, and when the instances contained in the task are run, the surplus resources of the physical machine may be allocated, in whole or in part, to the current user. For example, when the initial computing resource of the instances is the computing resource (e.g., an 8-core CPU and a memory of 32 GB) and it is determined that the actual hardware configuration of the physical machine corresponding to the initial computing resource is a 16-core CPU and a memory of 64 GB, the remaining 14-core CPU and a memory of 64 GB may be allocated, in whole, to the user, or the actual computing resource (for example, a 10-core CPU and a memory of 64 GB) may be allocated, in part, to the user.

According to some embodiments of the present disclosure, if it is expected to make the best use of the heterogeneous cloud computing resource to process tasks contained in a user's job and to improve the efficiency of the heterogeneous cloud computing resource in processing a task, the minimum computing resource required for processing the task may be specified in the resource description manifest when the task is generated, and it may be indicated that the actual computing resource greater than the minimum computing resource may be called to process the task. After the heterogeneous cloud computing resource receives the task and determines each initial computing resource required for processing the task according to the resource description manifest of the task, this solution may automatically increase, according to the indication of the resource description manifest, the initial computing resource into the actual computing resource supported by a physical machine corresponding to the initial computing resource to call an actual computing resource, being in excess of the initial computing resource, to process the instances contained in the task.

When the resource description manifest of the task is generated, the initial computing resource satisfying the minimum computing resource may be allocated to task instances according to the resource description manifest. Additionally, actual computing resources supported by the physical machine corresponding to the initial computing resource in excess of the initial computing resource may be called when the instances are executed only by specifying, in the resource description manifest, the minimum computing resource required for processing the instances contained in the task, and indicating, by means of the resource description manifest, that the cloud computing resource call the actual computing resource over the minimum computing resource to process the task instances.

Therefore, by means of the solution provided by embodiments of the disclosure, a user may, without manually splitting a job according to different resource demand types, automatically call the actual computing resource supported by the cloud computing resource to process the task instances. In this way, a job may be defined only according to the user's computing needs without splitting, in consideration of specific resource configuration of the heterogeneous cloud computing resource, a job to adapt to the heterogeneous cloud computing resource. Furthermore, when the task instances are processed, in the case of satisfying the user-specified minimum computing resource, the actual computing resource supported by the heterogeneous cloud computing resource may be automatically called. Thus, the heterogeneous cloud computing resources may be adaptively called to process the instances contained in the task, the utilization ratio of the heterogeneous cloud computing resource may be improved to quickly and efficiently process the user's job, and the performance in processing the user's job is improved.

Thus, according to some embodiments, the disclosure solves the technical problem that, in the prior art, when batch computing is conducted based on a heterogeneous cloud computing resource, the heterogeneous cloud computing resource is underutilized, which results in a low efficiency in processing the tasks contained in a user's job.

According to some embodiments of the present disclosure, the resource description manifest may include the number of processor cores of the computing resource required for processing the instances contained in the task, a memory of the computing resource and the quantity of the computing resource.

The following example of the method described with respect to FIG. 2 is made herein which is not limited in the disclosure.

As an example, a task sent by the client may contain 100 instances and the user may apply for specific computing resources to process the task (e.g., an 8-core CPU and a memory of 32 GB for each instance). The user then generates the task on the client before sending the to-be-processed task to the cloud computing service in step S31. When the task is generated, the user needs to specify the quantity of instances contained in the task (i.e., the concurrency need, which is 100 in this example), the address of a program run by the task, an input/output path, and resource needs (an 8-core CPU and a memory of 32 GB in this example). In this example, when any instance contained in this task is processed, the configuration of the required computing resources needs to meet the minimum configuration (namely, an 8-core CPU and a memory of 32 GB), and the 100 computing resources required for the task are executed. Thus, when the task is generated, the resource description manifest of the task includes resource needs (an 8-core CPU and a memory of 32 GB) as well as concurrency needs (100 instances).

After the cloud computing resource receives the task sent by the client in step S31, the initial computing resources configured to process the instances contained in the task are screened from the cloud computing resource according to the resource description manifest of the task in step S33. Specifically, the cloud computing resource may screen 100 computing resources whose configuration conforms to an 8-core CPU and a memory of 32 GB and uses them as computing resources for processing the task, where the 100 computing resources generate, according to the user's resource needs, the initial computing resource allocation to process the task.

Additionally, when the user generates a task and a resource description manifest corresponding to the task, the user may also specify, by means of a configuration item in the resource description manifest, whether an actual computing resource greater than the user-specified resource needs may be called when the task is executed and the user-specified resource needs are satisfied. If the actual hardware configuration of a physical machine corresponding to the initial computing resource is a 16-core CPU and a memory of 64 GB, and the cloud computing resource determines that the resource description manifest indicates a request for an actual computing resource, the cloud computing resource automatically calls the actual computing resource (for example, 14-core CPU and a memory of 64 GB) greater than the initial computing resource when the instances contained in the task are run in step S37.

Figure 3:
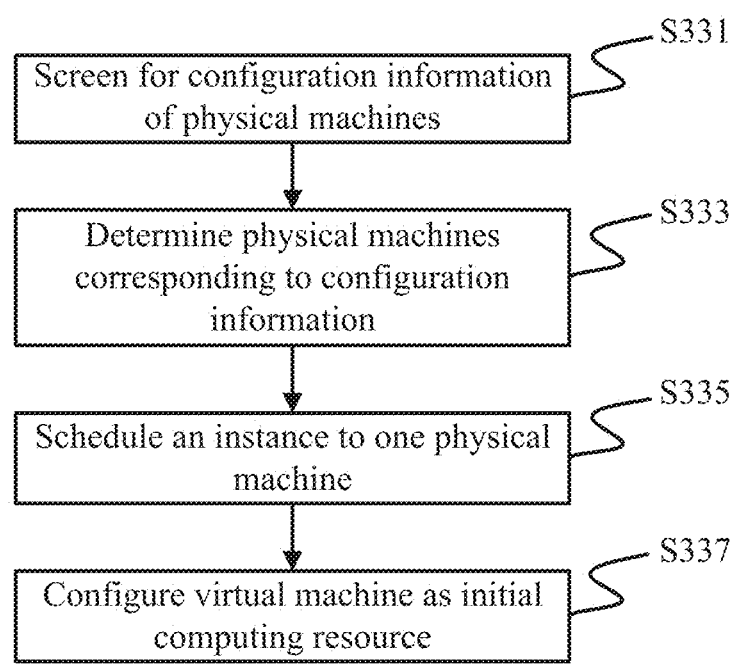
FIG. 3 is a flow diagram of a step of a scheduling method for processing task resources according to some embodiments of the disclosure.

In some embodiments, the step of determining the initial computing resource according to the resource description manifest (FIG. 2, step S33) may comprise the following steps illustrated in FIG. 3.

In step S331, the method screens a cluster to obtain configuration information of physical machines in the cluster satisfying a preset condition, wherein the configuration information of the physical machine cluster includes at least the number of processor cores and the memory of any physical machine in the physical machine cluster. In one embodiment, screening may be limited to those physical machines having a number of processor cores greater than or equal to that of the computing resource and the memory greater than or equal to that of the computing resource.

In some embodiments, for any task sent by the client, the cloud computing resource determines, according to the resource description manifest of the task, the configuration information of a physical machine cluster configured to execute the instances contained in the task. Specifically, the cloud computing resource screens, according to the recorded configuration information of a physical machine, physical machines whose number of processor cores (namely, the number of CPU cores) is greater than or equal to the number of CPU cores specified in the resource description manifest and whose memory is greater than or equal to the memory specified in the resource description manifest. The cloud computing resource then optionally selects physical machines having the same quantity as the computing resources specified in the resource description manifest, and records the identification of these physical machines, so as to subsequently identify a corresponding physical machine and schedule the instances contained in the task to the corresponding physical machine.

In some embodiments, the configuration of the computing resource required for processing the instances contained in the task specified in the resource description manifest is equal to the sum of the configuration of the initial computing resource in the embodiments of the present disclosure and the configuration used as the system overhead.

In step S333, the method determines the physical machine cluster corresponding to the configuration information of the physical machine cluster, the quantity of the physical machines contained in the physical machine cluster conforming to that of the computing resource.

In some embodiments, after the configuration information of the physical machine cluster is obtained by screening, the physical machine cluster corresponding to the configuration information is determined from the cloud computing resource according to the identification of the physical machines corresponding to the configuration information.

In step S335, the method schedules an instance contained in the task to one physical machine in the physical machine cluster. Specifically, after determining the physical machine cluster corresponding to the configuration information of the physical machine cluster, each instance contained in the task is separately scheduled onto each physical machine in the physical machine cluster, wherein each physical machine schedules one instance.

In step S337, the method configures the corresponding physical machine to generate a virtual machine serving as the initial computing resource. The configuration information of the virtual machine includes at least the number of processor cores and a memory of the virtual machine, the number of processor cores of the virtual machine conforming to that of the computing resource, and the memory of the virtual machine conforming to that of the computing resource.

Specifically, after each instance contained in the task is scheduled onto each physical machine, the virtual machine is generated, according to the number of CPU cores and the memory specified in the resource description manifest of the task, serving as the initial computing resource. The initial computing resource is the minimum computing resource required for executing the instance, and the sum of the configuration of the initial computing resource and the configuration reserved as the system overhead is equal to the configuration of the computing resource comprised in the resource description manifest.

Consider, as an example, the application scenario in which the resource description manifest contained in the task includes resource needs (an 8-core CPU and a memory of 32 GB) and concurrency needs (100 instances). By taking an example in which the cloud computing resource includes 200 16-core (a memory of 64 GB) physical machines, 100 24-core (a memory of 48 GB) physical machines, and 50 32-core (a memory of 128 GB) physical machines, after receiving the task sent by the client, the cloud computing resource determines, from the recorded configuration information of the 350 physical machines, the configuration information of the physical machines that conform with the resource description manifest according to the resource description manifest of the task. In this example, the configuration information of all 350 physical machines conforms to the resource description manifest, from which 100 physical machines are optionally selected to constitute a physical machine cluster, and identifiers of these physical machines are recorded. For example, according to the configuration information of each recorded physical machine, 20 16-core CPU (a memory of 64 GB) physical machines, 30 24-core CPU (48 G memory) physical machines and 50 32-core CPU (a memory of 128 GB) physical machines are screened to together constitute a physical machine cluster.

After the configuration information of the physical machine cluster is obtained, corresponding physical machines are determined from the cloud computing resource according to the identifiers of the screened 100 physical machines, and then 100 instances in the task are separately scheduled onto the 100 physical machines, wherein each physical machine corresponds to one instance. For any physical machine, after instances contained in the task are received, a virtual machine is generated according to the number of CPU cores and the memory (8-core and 32 GB in this example) specified in the resource description manifest of the task, and two cores and a memory of 4 GB are reserved as the system overhead. The virtual machine serves as the initial computing resource configured to execute the instance; that is, the virtual machine serves as the initial computing resource having configuration of 6-core CPU and a memory of 28 GB.

In some embodiments of the present disclosure, by scheduling one instance to one physical machine, the physical machine generates one virtual machine according to the received the instance contained in the task, thereby requiring that a single physical machine support a single virtual machine. This constraint avoids the problem found in the prior art that when a single physical machine supports multiple virtual machines the multiple virtual machines on the single physical machine compete for resources. Thus, by using a single physical machine for a single virtual machine, the method embodied in FIG. 3 prevents the decline of the overall performance of the cloud computing resource in processing a user's job and improves the efficiency in processing a user's job.

Figure 4:
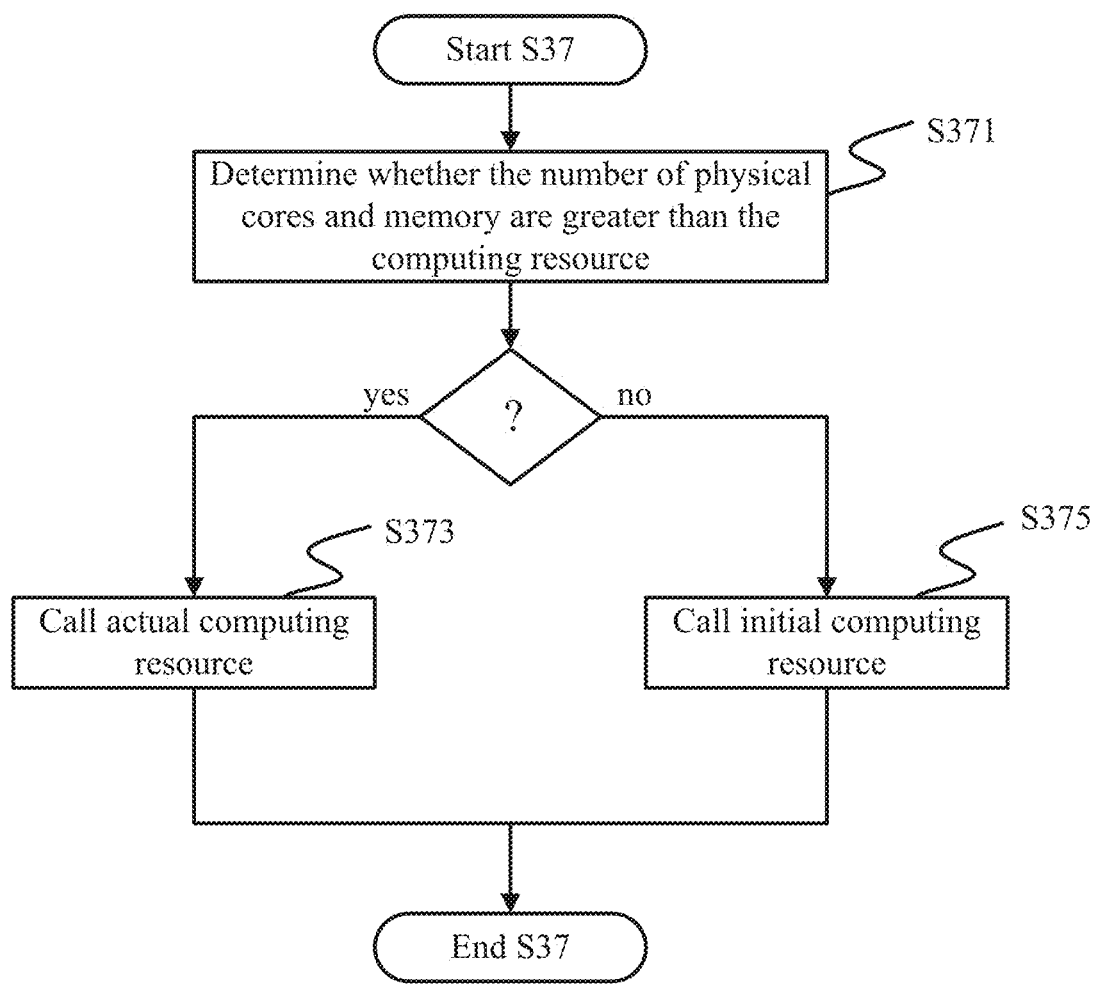
FIG. 4 is a flow diagram of a scheduling method for processing task resources according to some embodiments of the disclosure.

In some embodiments of the disclosure, Step S37 may include the following steps S371 to S375 illustrated in FIG. 4.

In step S371, the method determines whether the number of processor cores of the physical machine is greater than that of the computing resource, and whether the memory of the physical machine is greater than that of the computing resource.

In step S373, the method calls the actual computing resource when the number of processor cores of the physical machine is greater than that of the computing resource, or the memory of the physical machine is greater than that of the computing resource. Conversely, in step S375, the method calls the initial computing resource when the number of processor cores of the physical machine is equal to that of the computing resource, and the memory of the physical machine is equal to that of the computing resource.

In some embodiments, after it is determined that resource description manifest calls the actual computing resource, before calling the actual computing resource to process the instances the method first judges whether the actual computing resource (which is greater than the initial computing resource) can be called. Only when the actual hardware configuration of the physical machine is higher than the configuration of the computing resource specified by the user in the resource description manifest can the actual computing resource, in excess of the initial computing resource, be called; otherwise, only the initial computing resource can be called to process the instances.

In some embodiments, for any physical machine that receives instances, it is determined whether the actual hardware configuration of the physical machine is higher than the configuration of the computing resource specified by the user in the resource description manifest. For example, it may be determined whether the number of CPU cores of the physical machine is greater than that of the computing resource specified by the user, and whether the memory of the physical machine is greater than that of the computing resource specified by the user. Step S373 is executed when it is determined that the number of CPU cores of the physical machine is greater than that of the computing resource specified by the user, or the memory of the physical machine is greater than that of the computing resource specified by the user. Step S375 is executed when it is determined that the number of CPU cores of the physical machine is equal to that of the computing resource specified by the user, and the memory of the physical machine is equal to that of the computing resource specified by the user.

In some embodiments, for any physical machine that receives instances, when it is determined that the actual hardware configuration of the physical machine is greater than the computing resource specified by the user in the resource description manifest, the actual computing resource greater than the initial computing resource is called to process the instance scheduled onto the physical machine.

Figure 5:
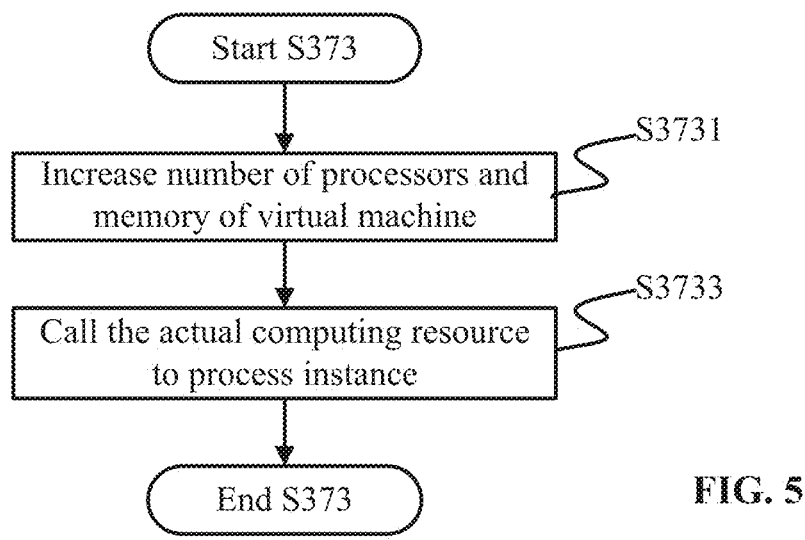
FIG. 5 is a flow diagram of a step of a scheduling method for processing task resources according to some embodiments of the disclosure.

In some embodiments, step S373 may comprise the following steps S3731 and S3733 illustrated in FIG. 5.

In step S3731, the method increases the number of processor cores of the virtual machine and the memory of the virtual machine to obtain the actual computing resource.

In some embodiments, for any physical machine that receives instances, when it is determined that the actual hardware configuration of the physical machine is greater than the computing resource specified by the user in the resource description manifest, the configuration of the virtual machine generated by the physical machine is increased to obtain the actual computing resource having a higher configuration. Specifically, the number of CPU cores and the memory of the virtual machine may be increased, and the virtual machine whose configuration is increased serves as the actual computing resource.

In some embodiments, the configuration of the virtual machine serving as the initial computing resource may be increased for any configuration not exceeding the maximum available configuration supported by the physical machine. In order to further improve the utilization ratio of the cloud computing resource, the number of CPU cores and the memory of the virtual machine serving as the initial computing resource may be increased to the maximum available number of CPU cores and the maximum available memory supported by the physical machine.

In some embodiments, step S3731 may include increasing the number of processor cores of the virtual machine to the maximum available number of processor cores supported by the corresponding physical machine, and increasing the memory of the virtual machine to the maximum available memory supported by the corresponding physical machine.

Specifically, the number of CPU cores of the virtual machine serving as the initial computing resource is increased to the maximum available number of CPU cores supported by the corresponding physical machine, and the memory of the virtual machine is increased to the maximum available memory supported by the physical machine.

In step S3733, the method calls the actual computing resource to process the instance scheduled onto the corresponding physical machine.

Specifically, after the configuration of the virtual machine is increased to obtain the actual computing resource having higher configuration, the actual computing resource is called to process the instances of the physical machine. In this way, the performance in processing a user's job is improved, the utilization ratio of the cloud computing resource is improved, and the problem of underperformance in processing a user's job and underutilization of the cloud computing resource is avoided.

Consider, as an example, the scenario in which the resource description manifest contained in the task includes resource needs (an 8-core CPU and a memory of 32 GB) and concurrency needs (100 instances). In this example, 20 16-core CPU (a memory of 64 GB) physical machines, 30 24-core CPU (a memory of 48 GB) physical machines and 50 32-core CPU (a memory of 128 GB) physical machines may be screened to serve as an application scenario in which the 100 instances of computing resource is executed, and one 16-core CPU (a memory of 64 GB) physical machine is selected. When the physical machine receives the to-be-executed instances, a 6-core CPU (a memory of 28 GB) virtual machine (two CPU cores and a memory of 4 GB are reserved as the system overhead) is generated according to the resource needs specified by the user in the resource description manifest. If it is determined that the user specifies, in the resource description manifest, that the actual computing resource may be called to process the instance if it is determined whether the actual configuration of the physical machine is higher than the configuration specified by the user in the resource description manifest, and then the corresponding computing resource is called according to the determination.

In this example, it may be determined that the configuration (a 16-core CPU and a memory of 64 GB) of the physical machine is higher than the configuration (an 8-core CPU and a memory of 32 GB) specified by the user in the resource needs, the physical machine may increase the configuration of the virtual machine generated by itself to a 14-core CPU and a memory of 60 GB to obtain a new virtual machine, having a configuration of a 14-core CPU and a memory of 60 GB, used as the actual computing resource, and then the new virtual machine is called to process the instances scheduled onto the physical machine.

According to some embodiments of the disclosure, when it is determined that the resource description manifest indicates a request for the actual computing resource and the actual hardware configuration of the physical machine corresponding to the initial computing resource is higher than the computing resource specified by the user, the configuration of the initial computing resource is increased to the maximum available configuration supported by the corresponding physical machine, thereby realizing full utilization of the computing resource of the physical machine, which not only improves the performance in processing user's job, but also improves the utilization ratio of the cloud computing resource.

Returning to FIG. 4, in step S375, the method calls the initial computing resource to process the instances contained in the task.

In some embodiments, for any physical machine that receives instances, when it is determined that the actual hardware configuration of the physical machine is equal to the computing resource specified by the user in the resource description manifest, the initial computing resource generated in step S337 is called to process the instance scheduled onto the physical machine.

When it is determined that the actual hardware configuration of the physical machine is equal to the computing resource specified by the user in the resource description manifest, it indicates that the maximum available resource of the physical machine is equal to the minimum computing resource of the user. Therefore, the computing resource of the physical machine has been utilized fully.

Consider, as an example, the scenario in which the resource description manifest contained in the task includes resource needs (an 8-core CPU and a memory of 32 GB) and concurrency needs (100 instances). For example, in a scenario in which one 8-core CPU (a memory of 32 GB) physical machine among instances is received, when the physical machine receives a to-be-executed instance, a 6-core CPU (a memory of 28 GB) virtual machine (2 CPU cores and a memory of 4 GB are reserved as the system overhead) is generated according to the resource needs specified by the user in the resource description manifest. If it is determined that the user specifies, in the resource description manifest, that the actual computing resource may be called to process the instance and if it is determined whether the actual configuration of the physical machine is higher than the configuration specified by the user in the resource needs, then the corresponding computing resource is called according to the request for an actual computing resource present in the resource description manifest.

In this example, it may be determined that the configuration (an 8-core CPU and a memory of 32 GB) of the physical machine is equal to the configuration (an 8-core CPU and a memory of 32 GB) specified by the user in the resource needs, the computing resource of the physical machine has been fully utilized and it is unable to provide a virtual machine having higher configuration. Then the virtual machine (6-core CPU and a memory of 28 GB) is called to process the instance scheduled onto the physical machine.

According to some embodiments of the present disclosure, when it is determined that the resource description manifest indicates a request for the actual computing resource and the actual hardware configuration of the physical machine corresponding to the initial computing resource is equal to the computing resource specified by the user, the configuration of the initial computing resource is the maximum available configuration supported by the corresponding physical machine, thereby realizing full utilization of the computing resource of the physical machine, and guaranteeing to make the best use of the cloud computing resource.

Figure 6:
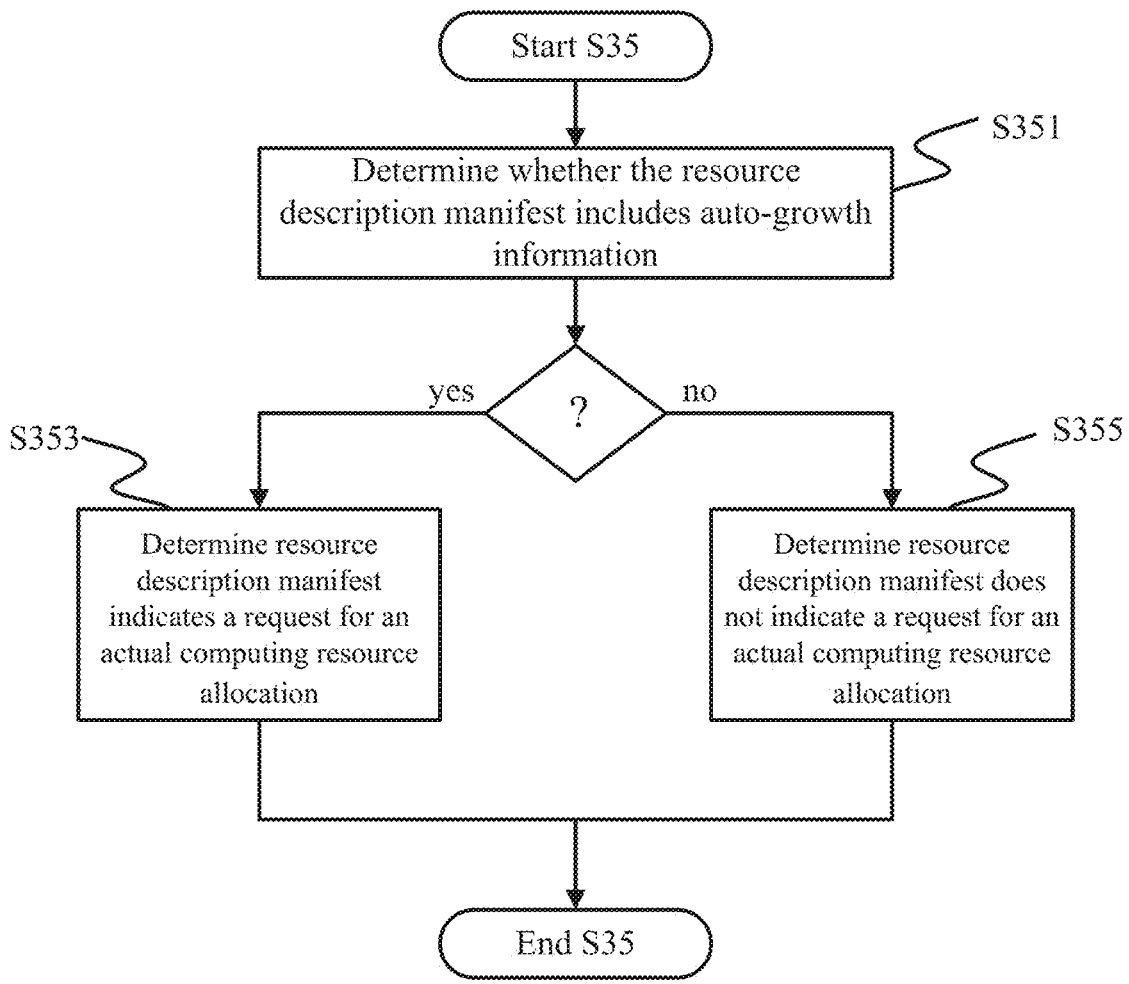
FIG. 6 is a flow diagram of a step of a scheduling method for processing task resources according to some embodiments of the disclosure.

According to embodiments of the disclosure, step S35 may comprise the following steps S351 to S355 illustrated in FIG. 6.

In step S351, the method determines whether the resource description manifest comprises resource auto-growth information.

The method may perform step S353 when the resource description manifest contains the resource auto-growth information. The method may perform step S355 when the resource description manifest does not contain the resource auto-growth information.

In some embodiments, when the user generates a task on the client, an indication to call the actual computing resource is implemented by configuring resource auto-growth information in the resource description manifest of the task. If the user does not need to call a resource higher than the computing resource specified by the user to process the task, the user may only need not to configure the resource auto-growth information in the resource description manifest of the task.

Specifically, when it is determined whether the resource description manifest indicates a request for the actual computing resource higher than the computing resource specified by the user, it is determined whether the resource auto-growth information may be read from the resource description manifest.

In step S353, the method determines whether the resource description manifest indicates a request for the actual computing resource. Specifically, when the resource description manifest contains the resource auto-growth information, it is determined whether the user indicates a request for the cloud computing resource higher than the computing resource specified by the user in the resource description manifest to process the instance.

In step S355, the method determines whether the resource description manifest does not indicate a request for the actual computing resource. Specifically, when the resource description manifest does not contain the resource auto-growth information, it is determined that the user does not need the cloud computing resource in excess of the computing resource specified in the resource description manifest; that is, it is determined that the user indicates processing the instance according to the computing resource specified by the user in the resource description manifest.

In some embodiments, after step S355, the method may further include calling the initial computing resource to process the instance scheduled onto the corresponding physical machine. Specifically, after it is determined that the resource description manifest does not indicate a request for the actual computing resource, the virtual machine serving as the initial computing resource is controlled to process the instance scheduled onto the corresponding physical machine according to the computing resource specified by the user in the resource description manifest.

Consider, as an example, the scenario in which the resource description manifest contained in the task includes resource needs (an 8-core CPU and a memory of 32 GB) and concurrency needs (100 instances). When the user generates the task, in addition to indicating, in the resource description manifest, the resource needs (an 8-core CPU and a memory of 32 GB), the user may also indicate whether to call higher actual computing resources to process the task by means of the resource auto-growth information (for example, an auto-boost configuration item in the resource description manifest) in the resource description manifest. For example, if the user sets up activation for the auto-boost configuration item, it indicates that the user adds resource auto-growth information in the resource description manifest. If the user disables the auto-boost configuration item, it indicates that the user does not desire to add resource auto-growth information in the resource description manifest.

An example is taken, in which, a 16-core CPU (a memory of 64 GB) physical machine among instances is received. When the physical machine receives a to-be-executed instance, a 6-core CPU (a memory of 28 GB) virtual machine (2 CPU cores and a memory of 4 GB are reserved as the system overhead) is generated according to the resource needs specified by the user in the resource description manifest. Then it is determined whether the user requests, in the resource description manifest, higher actual computing resource, and corresponding computing resource is called to process the instance scheduled onto the corresponding physical machine according to the determination.

Specifically, in this example, it may be determined whether the user gives instructions to call the actual computing resource by determining whether the auto-boost configuration item is activated in the resource description manifest. It is determined that the user gives instructions to request the actual computing resource to process the instance if it is determined that the auto-boost configuration item is activated in the resource description manifest. After it is further determined that the configuration (a 16-core CPU and a memory of 64 GB) of the physical machine is greater than the computing resource (an 8-core CPU and a memory of 32 GB) specified by the user in the resource description manifest, the configuration of the virtual machine is promoted from 6-core CPU and a memory of 28 GB to 14-core CPU and a memory of 60 GB, and then a new virtual machine having a configuration of 14-core CPU and a memory of 60 GB is used to process the instance scheduled onto the corresponding physical machine.

In this example, it is determined that the user does not indicate a request for the actual computing resource to process this instance if it is determined that the auto-boost configuration item is disabled by the user in the resource description manifest, and then a virtual machine having a configuration of 6-core CPU and a memory of 28 GB is called to process the instance scheduled onto the physical machine.

According to some embodiments of the present disclosure, by means of the resource auto-growth information in the resource description manifest, the user may select whether to call computing resources higher than the required computing resources to process the task according to the computing needs, thereby improving the user experience.

Figure 7:
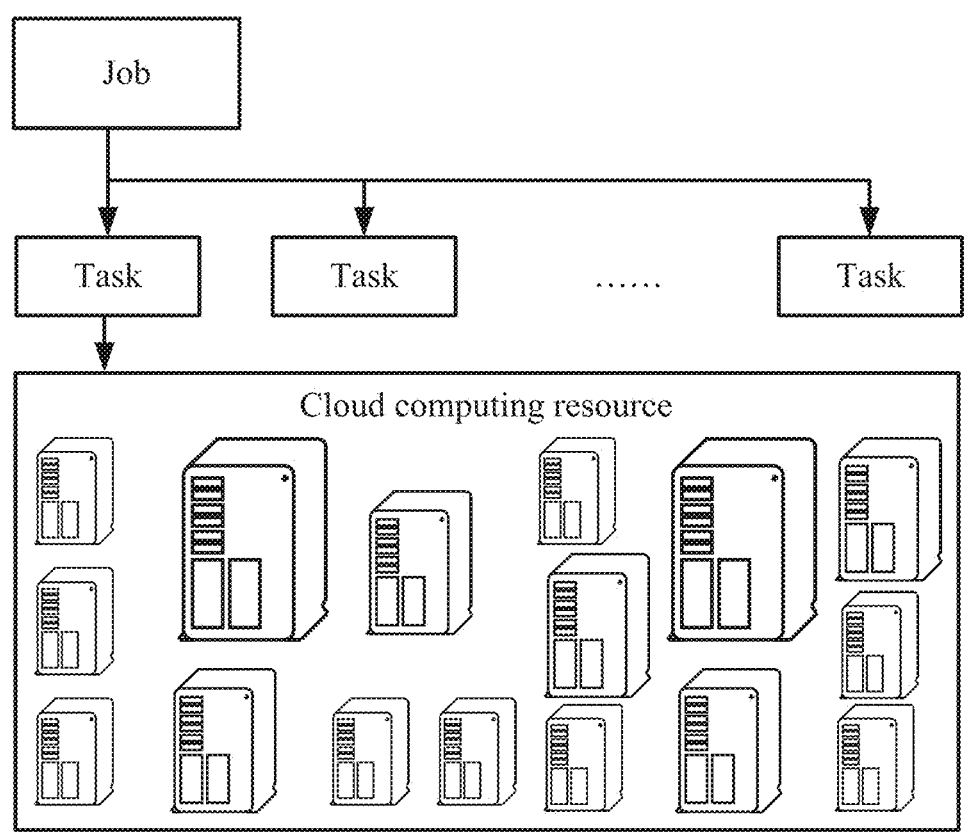
FIG. 7 is a flow diagram of allocating, by an optional batch computing service, computing resource according to some embodiments of the disclosure.
Figure 8:
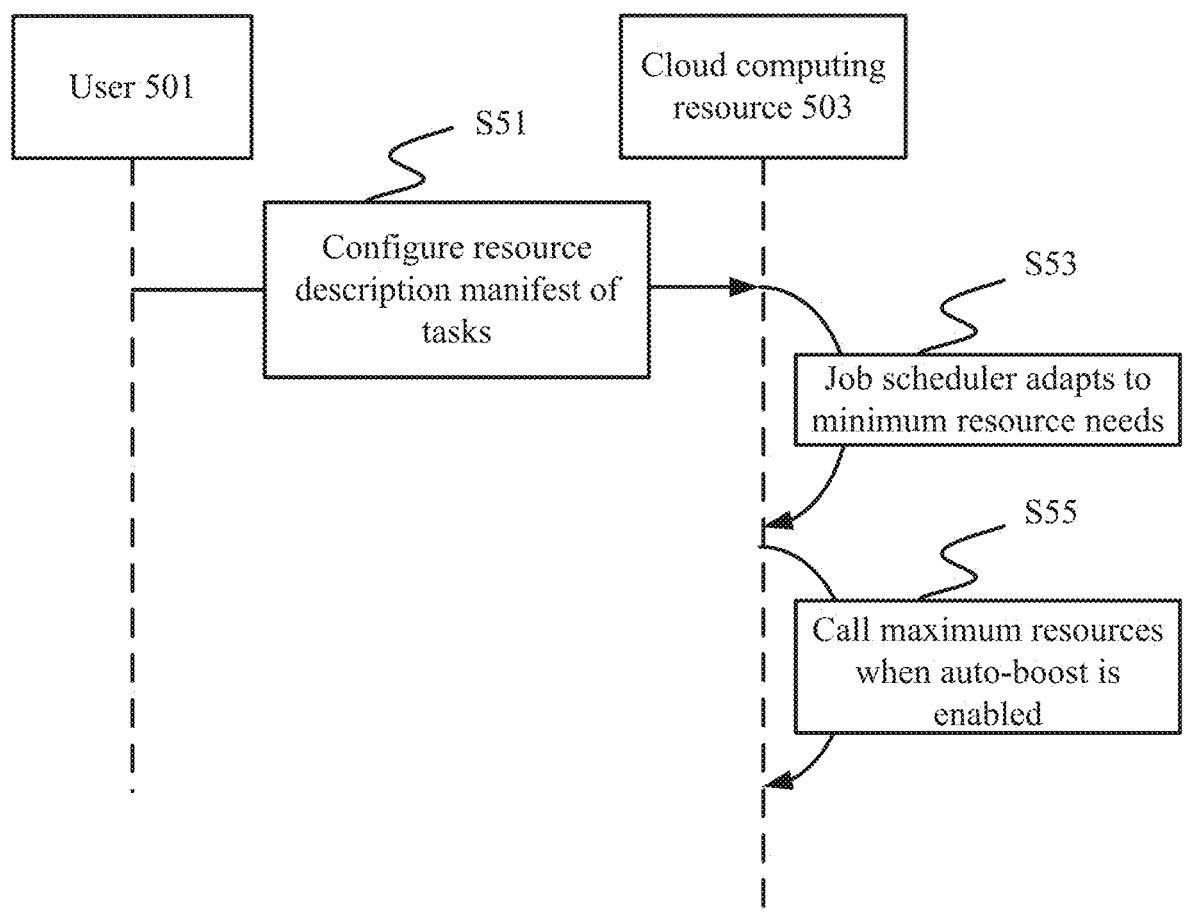
FIG. 8 is a flow diagram of an optional scheduling method for processing task resources according to some embodiments of the disclosure.

The following introduces, in detail, an embodiment of the present disclosure with reference to FIG. 7 and FIG. 8. Specifically, FIG. 7 illustrates a cloud computing resource including multiple physical machines having different configurations and a job containing multiple task resources. FIG. 8 illustrates an optional scheduling method for processing the task and resources, according to some embodiments of the disclosure.

In step S51, the method configures the resource description manifest of tasks contained in a job. In some embodiments, in order to achieve a computing goal, when the user 501 generates a job, the user configures corresponding resource description manifest for each task contained in the job, specifies the minimum resource needs (for example, an 8-core CPU and a memory of 32 GB) required for processing the task, and specifies that the cloud computing resource may grow automatically according to its actual hardware configuration. That is, the user may specify that the cloud computing resource may call computing resource higher than an 8-core CPU and a memory of 32 GB to process the instances contained in the task.

In step S53, the method, via a job scheduler on the cloud computing resource, adapts to the minimum resource needs. Specifically, the job scheduler on the cloud computing resource 503 schedules each instance onto each physical machine in the cloud computing resource according to the resource description manifest, wherein one instance is scheduled onto one physical machine. In some embodiments, the job scheduler on the cloud computing resource schedules each instance onto each physical machine having a configuration higher than an 8-core CPU and a memory of 32 GB.

As illustrated in FIG. 8, embodiments of step S53 may be consistent with that of step S33, the description of which is not repeated herein for the sake of clarity.

In step S55, the method calls all the maximum available resource supported by the physical machine to process the instance after it is determined that the auto-boost configuration item is enabled.

In some embodiments, after the instance is scheduled onto the physical machine, the physical machine first generates an initial virtual machine (namely, the initial computing resource in an embodiment of the present disclosure) according to the resource needs (for example, an 8-core CPU and a memory of 32 GB) specified by the user in the resource description manifest, wherein the configuration of the initial virtual machine is a 6-core CPU and a memory of 28 GB (2 CPU cores and a memory of 4 GB are reserved as the system overhead). Then the cloud computing resource determines whether the user instructs, in the resource description manifest, calling the actual computing resource (for example, the auto-boost configuration item is enabled) higher than the computing resource specified by the user to process the instance.

In some embodiments, if it is read that the auto-boost configuration item is enabled, the maximum available resource supported by the physical machine is called to process the instance. Specifically, if the actual hardware configuration of the physical machine is a 16-core CPU and a memory of 64 GB, the configuration of the initial virtual machine is grown automatically into a 14-core CPU and a memory of 60 GB to obtain an actual virtual machine, and the actual virtual machine is called to process the instance scheduled onto the physical machine.

According to some embodiments of the present disclosure, the user only needs to configure the auto-boost configuration item in the resource description manifest of the task. If the actual configuration of the cloud computing resource is higher than the configuration of the computing resource specified by the user, the actual resource occupied by the instances contained in the task when they are running may correspondingly grow dynamically. The user does not need to know the actual configuration of heterogeneous cloud computing resource to realize processing of the task by automatically adapting to the heterogeneous cloud computing resource. The solution provided by embodiments of the present disclosure not only realizes improvement of performance in processing a user's job when the user has no perception, but also further improves the utilization ratio of the heterogeneous cloud computing resource.

For clarity, the embodiments are described as a combination of a series of actions. However, those skilled in the art will appreciate that the disclosure is not limited by sequences of the actions described. This is because, in accordance with the disclosure, some steps may be performed by using other sequences or may be performed simultaneously. In addition, those skilled in the art should also appreciate that the embodiments described in the specification are exemplary embodiments, and the related actions and modules are not necessary for the disclosure.

It can be seen from the description of the embodiments that the methods of the embodiments may be realized by means of software and necessary general hardware platforms, or of course by means of hardware, but in most cases, the former is the better embodiment. Based on such an understanding, the technical solution of the present disclosure, in essence, either partially contributes to the prior art or embodies all or a part of the technical solution in the form of software products, which may be stored in storage media (such as ROM/RAM, diskettes, or optical disks), including some instructions so that it is possible to execute the method as recited in embodiments of the present disclosure by a terminal device (a mobile phone, a computer, a server, a network device, and the like).

Figure 9:
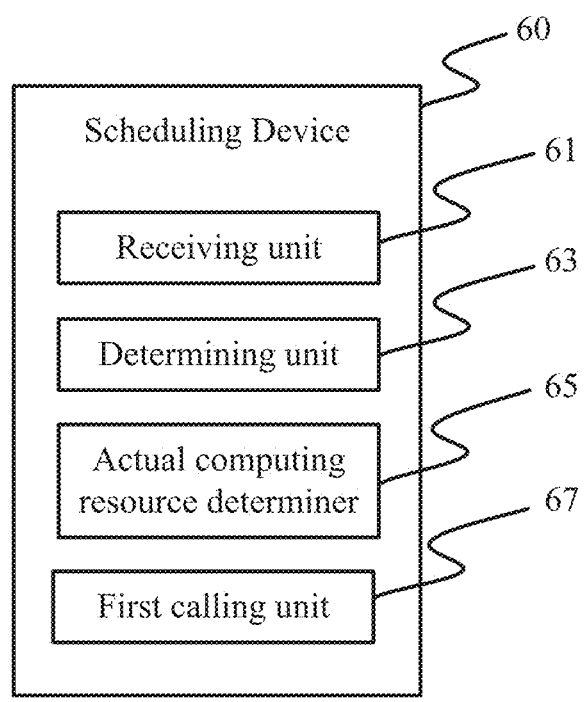
FIG. 9 is a diagram of a scheduling device for processing task resources according to some embodiments of the disclosure.

FIG. 9 is a diagram of a scheduling device for processing task resources, according to some embodiments of the disclosure. As illustrated in FIG. 9, the scheduling device 60 may comprise: a receiving unit 61, a determining unit 63, a first judging unit 65 and a first calling unit 67.

The receiving unit 61 is configured to receive at least one task sent by the client. Each of the tasks may contain one or more instances and a resource description manifest required for processing the instances contained in the task.

In some embodiments, the client may be an application program installed on a computer, a tablet computer, a notebook computer, and the like. A user may generate a job by logging into the client and according to a specific computing need. A job contains at least one task, each task contains one or more instances, and each instance in each task calls the same computing resource which may be described through the resource description manifest.

In some embodiments, the resource description manifest includes at least an address of a program run by a task, an input/output path of data required for the program run, resource needs (such as CPU, memory, and the like) and concurrency needs (namely, the quantity of instances contained in each task).

It is to be noted that the resource needs specified by the user in the resource description manifest contain resources used as system overhead. For example, when the user's resource need is an 8-core CPU, 2 cores may be used as the system overhead and the remaining 6 cores may be used for processing the instances contained in a user's job.

The determining unit 63 is configured to determine the initial computing resource allocation according to the resource description manifest. The initial computing resource is the minimum computing resource called for processing the instances contained in the task.

Specifically, after a plurality of tasks sent by the client is received, for any task therein, the cloud computing resource determines, according to the resource description manifest contained in this task, the initial computing resource of the instances contained in the task. The initial computing resource is the minimum computing resource satisfying the resource description manifest contained in the task.

In some embodiments, the cloud computing resource reads, from the resource description manifest contained in a task, configuration information of computing resource required for processing the instances contained in the task, and screens, according to the configuration information, the computing resource whose configuration conforms to the configuration information as the initial computing resource.

The actual computing resource determiner 65 is configured to determine whether the resource description manifest indicates a request for utilizing an actual computing resource. The actual computing resource is a computing resource greater than the initial computing resource.

Specifically, for any task among the received at least one to-be-processed task, after the initial computing resource configured to process the task is determined according to the resource description manifest of the task, it is determined whether the resource description manifest indicates a request for the actual computing resource greater than the initial computing resource to process the task. The actual hardware configuration (for example, the number of CPU cores, memory, and the like of a physical machine) of the physical machine corresponding to the initial computing resource may be greater than the configuration of the initial computing resource. The actual computing resource and the initial computing resource correspond to the same physical machine. The configuration of the actual computing resource may be higher than that of the initial computing resource, but is not in excess of the actual hardware configuration of the physical machine.

In some embodiments, in order to improve the utilization ratio of the cloud computing resource, when the task is generated on the client, the user may specify whether the computing resource called for processing the task can grow dynamically according to the actual configuration supported by the cloud computing resource. The user may specify when the instances contained in the task run, and whether the actual resources occupied by the instances contained in the task may be greater than the computing resources specified by the user in the resource description manifest.

In some embodiments, after determining the initial computing resource configured to process the task according to the resource description manifest contained in the task, the cloud computing resource determines whether the resource description manifest indicates a request for the actual computing resource that can be supported by the physical machine corresponding to the initial computing resource to process the instances contained in the task.

The first calling unit 67 is configured to call the actual computing resource to process the instances contained in the task when the resource description manifest indicates a request for the actual computing resource.

Specifically, the actual computing resource in excess of the initial computing resource is called to process the instances contained in the task when it is determined that the resource description manifest indicates a request for the actual computing resource.

In some embodiments, after scheduling each instance contained in a task to the corresponding initial computing resource, the cloud computing resource automatically calls the actual computing resource greater than the initial computing resource to run the instances contained in the task when the instances are executed when it is determined that the resource description manifest indicates a request for the actual computing resource. This avoids the problem in the prior art that cloud computing resource are wasted because a task is processed according to the user-specified resource needs and exempts the user from manually splitting a job according to different types of resource needs. The embodiment described in FIG. 9 automatically processes a task according to the actual configuration of the cloud computing resource, improving the utilization ratio of the cloud computing resource, and further improving the efficiency in processing the tasks contained in the user's job.

According to some embodiments of the disclosure, if it is expected to make the best use of the heterogeneous cloud computing resource to process tasks contained in a user's job and to improve the efficiency of the heterogeneous cloud computing resource in processing a task, the minimum computing resource required for processing the task may be specified in the resource description manifest when the task is generated, and it may be indicated that the actual computing resource greater than the minimum computing resource may be called to process the task. After the heterogeneous cloud computing resource receives the task and determines each initial computing resource required for processing the task according to the resource description manifest of the task, this solution may automatically grow, according to the indication of the resource description manifest, the initial computing resource into the actual computing resource supported by a physical machine corresponding to the initial computing resource to call actual computing resource having higher configuration to process the instances contained in the task.

When the resource description manifest of the task is generated, the initial computing resource satisfying the minimum computing resource may be allocated to task instances according to the resource description manifest. Additionally, actual computing resources having higher configuration supported by the physical machine corresponding to the initial computing resource may be called when the instances are executed only by specifying, in the resource description manifest, the minimum computing resource required for processing the instances contained in the task, and indicating, by means of the resource description manifest, the cloud computing resource to call the actual computing resource greater than the minimum computing resource to process the task instances.

Therefore, by means of the solution provided by the embodiments of the present disclosure, a user may realize, without manually splitting a job according to different resource demand types, the automatic calling of the actual computing resource supported by the cloud computing resource to process the task instances. In this way, it is realized that a job may be defined only according to the user's computing needs without splitting, in consideration of specific resource configuration of the heterogeneous cloud computing resource, a job to adapt to the heterogeneous cloud computing resource. Furthermore, when the task instances are processed, if satisfying the user-specified minimum computing resource, the actual computing resource supported by the heterogeneous cloud computing resource may be automatically called. Thus, the heterogeneous cloud computing resources may be adaptively called to process the instances contained in the task, the utilization ratio of the heterogeneous cloud computing resource may be improved to quickly and efficiently process the user's job, and the performance in processing the user's job is improved.

Thus, the embodiments of the disclosure described above solve the technical problem that, in the prior art, when batch computing is conducted based on a heterogeneous cloud computing resource, the heterogeneous cloud computing resource is underutilized, which results in a low efficiency in processing the tasks contained in a user's job.

According to some embodiments of the present disclosure, the resource description manifest may include: the number of processor cores of the computing resource required for processing the instances contained in the task, the memory of the computing resource and the quantity of the computing resource.

Figure 10:
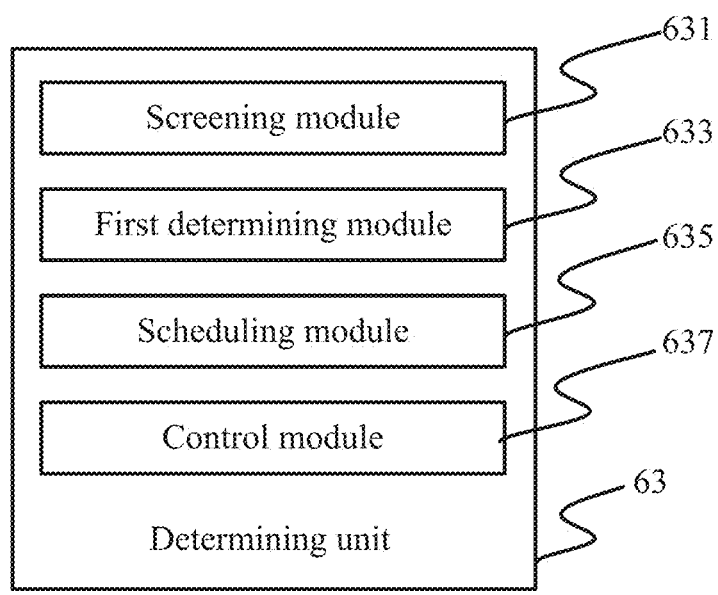
FIG. 10 is a diagram of a determining unit in a scheduling device for processing task resources according to some embodiments of the disclosure.

As shown in FIG. 10, in some embodiments the determining unit 63 may include a screening module 631, a first determining module 633, a scheduling module 635 and a control module 637.

The screening module 631 is configured to screen the cloud computing resources to obtain configuration information of a physical machine cluster satisfying a preset condition. The configuration information of the physical machine cluster includes at least the number of processor cores of any physical machine in the physical machine cluster and a memory of the physical machine, the number of processor cores of the physical machine being greater than or equal to that of the computing resource, and the memory of the physical machine being greater than or equal to that of the computing resource.

In some embodiments, for any task sent by the client, the cloud computing resource determines, according to the resource description manifest of the task, the configuration information of a physical machine cluster configured to execute the instances contained in the task. Specifically, the cloud computing resource screens, according to the recorded configuration information of a physical machine, physical machines whose number of processor cores (namely, the number of CPU cores) is greater than or equal to the number of CPU cores specified in the resource description manifest and whose memory is greater than or equal to the memory specified in the resource description manifest, then optionally selects physical machines having the same quantity as the computing resources specified in the resource description manifest, and then records the identification of these physical machines, so as to subsequently identify a corresponding physical machine according to the identification of the physical machine and schedule the instances contained in the task to the corresponding physical machine.

In some embodiments, the configuration of the computing resource required for processing the instances contained in the task specified in the resource description manifest is equal to the sum of the configuration of the initial computing resource in the embodiments of the present disclosure and the configuration used as the system overhead.

The first determining module 633 is configured to determine, from the cloud computing resource, the physical machine cluster corresponding to the configuration information of the physical machine cluster. The quantity of physical machines contained in the physical machine cluster conforms to that of the computing resource.

In some embodiments, after the configuration information of the physical machine cluster is obtained by screening, the physical machine cluster corresponding to the configuration information is determined from the cloud computing resource according to the identification of the physical machine corresponding to the configuration information.

The scheduling module 635 is configured to schedule any instance contained in the task to one physical machine in the physical machine cluster.

Specifically, after determining the physical machine cluster corresponding to the configuration information of the physical machine cluster, each instance contained in the task is separately scheduled onto each physical machine in the physical machine cluster, wherein each physical machine schedules one instance.

The control module 637 is configured to control the corresponding physical machine to generate a virtual machine serving as the initial computing resource. The configuration information of the virtual machine includes at least the number of processor cores and a memory of the virtual machine, the number of processor cores of the virtual machine conforms to that of the computing resource, and the memory of the virtual machine conforms to that of the computing resource.

Specifically, after each instance contained in the task is scheduled onto each physical machine, the virtual machine is generated, according to the number of CPU cores and the memory specified in the resource description manifest of the task, serving as the initial computing resource. The initial computing resource is the minimum computing resource required for executing the instance, and the sum of the configuration of the initial computing resource and the configuration reserved as the system overhead is equal to the configuration of the computing resource included in the resource description manifest.

In embodiments of the present disclosure, by scheduling one instance to one physical machine, the physical machine generates one virtual machine according to the received the instance contained in the task. Thus, a single physical machine supports a single virtual machine, and the problem is avoided that, in the prior art, when a single physical machine supports multiple virtual machines, the multiple virtual machines on the single physical machine scramble for resources, thus causing the decline of the overall performance of the cloud computing resource in processing a user's job, and improving the efficiency in processing a user's job.

Figure 11:
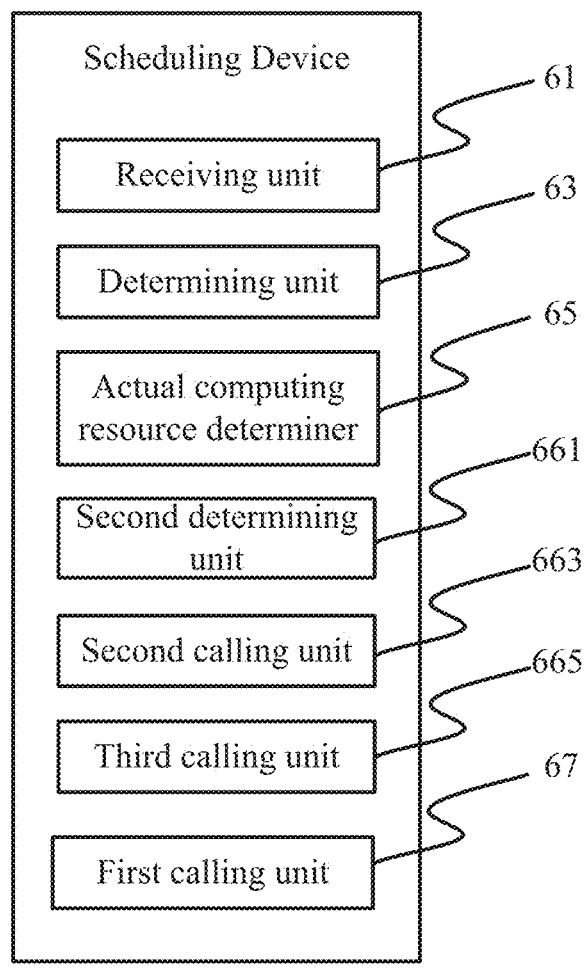
FIG. 11 is a diagram of a scheduling device for processing task resources according to some embodiments of the disclosure.

In embodiments of the present disclosure, as shown in FIG. 11, the scheduling device may further include a second judging unit 661, a second calling unit 663 and a third calling unit 665.

The second determining unit 661 is configured to determine, before calling the actual computing resource to process the instances contained in the task, whether the number of processor cores of the physical machine is greater than that of the computing resource, and whether the memory of the physical machine is greater than that of the computing resource.

In some embodiments, after it is determined that resource description manifest calls the actual computing resource, before calling the actual computing resource to process the instances, firstly, determining whether the actual computing resource in excess of the initial computing resource can be called. Only when the actual hardware configuration of the physical machine is higher than the configuration of the computing resource specified by the user in the resource description manifest can the actual computing resource in excess of the initial computing resource be called; otherwise, only the initial computing resource can be called to process the instances.

In some embodiments, for any physical machine that receives instances, it is determined whether the actual hardware configuration of the physical machine is higher than the configuration of the computing resource specified by the user in the resource description manifest. Specifically, it is determined whether the number of CPU cores of the physical machine is greater than that of the computing resource specified by the user, and whether the memory of the physical machine is greater than that of the computing resource specified by the user. The second calling unit 663 is activated when it is determined that the number of CPU cores of the physical machine is greater than that of the computing resource specified by the user, or the memory of the physical machine is greater than that of the computing resource specified by the user. The third calling unit 665 is activated when it is determined that the number of CPU cores of the physical machine is equal to that of the computing resource specified by the user, and the memory of the physical machine is equal to that of the computing resource specified by the user.

The second calling unit 663 is configured to call the actual computing resource in excess of the initial computing resource to process the instances contained in the task when the number of processor cores of the physical machine is greater than that of the computing resource, or the memory of the physical machine is greater than that of the computing resource.

In some embodiments, for any physical machine that receives instances, when it is determined that the actual hardware configuration of the physical machine is in excess of the computing resource specified by the user in the resource description manifest, the actual computing resource in excess of the initial computing resource is called to process the instance scheduled onto the physical machine. The configuration of the called actual computing resource is not higher than the actual hardware configuration of the physical machine.

Figure 12:
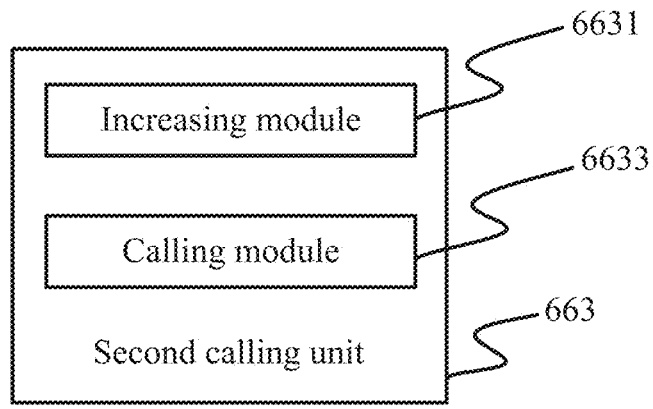
FIG. 12 is a diagram of an optional scheduling device for processing task resources according to some embodiments of the disclosure.

In some embodiments, as shown in FIG. 12, the second calling unit 663 may include an increasing module 6631 and a calling module 6633.

The increasing module 6631 is configured to increase the number of processor cores of the virtual machine and the memory of the virtual machine to obtain the actual computing resource.

In some embodiments, for any physical machine that receives instances, when it is determined that the actual hardware configuration of the physical machine is in excess of the computing resource specified by the user in the resource description manifest, the configuration of the virtual machine generated by the physical machine is increased to obtain the actual computing resource having higher configuration. Specifically, the number of CPU cores and the memory of the virtual machine are increased, and the virtual machine whose configuration is increased serves as the actual computing resource.

In some embodiments, the configuration of the virtual machine serving as the initial computing resource may be increased for any configuration not exceeding the maximum available configuration supported by the physical machine. In order to further improve the utilization ratio of the cloud computing resource, the number of CPU cores and the memory of the virtual machine serving as the initial computing resource may be increased to the maximum available number of CPU cores and the maximum available memory supported by the physical machine.

Figure 13:
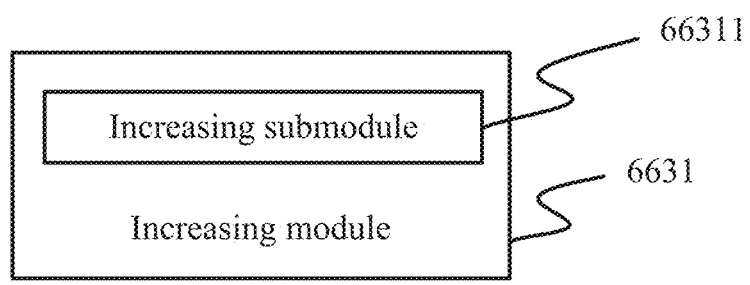
FIG. 13 is a diagram of an optional scheduling device for processing task resources according to some embodiments of the disclosure.

In some embodiments, as shown in FIG. 13, the increasing module 6631 may include an increasing submodule 66311, configured to increase the number of processor cores of the virtual machine to a maximum available number of processor cores supported by the corresponding physical machine, and increase the memory of the virtual machine to a maximum available memory supported by the corresponding physical machine.

Specifically, the number of CPU cores of the virtual machine serving as the initial computing resource is increased to the maximum available number of CPU cores supported by the corresponding physical machine, and the memory of the virtual machine is increased to the maximum available memory supported by the physical machine.

Returning to FIG. 12, the calling module 6633 is configured to call the actual computing resource to process the instance scheduled onto the corresponding physical machine.

Specifically, after the configuration of the virtual machine is increased to obtain the actual computing resource having higher configuration, the actual computing resource is called to process the instances of the physical machine. In this way, the performance in processing a user's job is improved, the utilization ratio of the cloud computing resource is improved, and the problem of underperformance in processing a user's job and underutilization of the cloud computing resource is avoided, which is caused because, in the prior art, a user's job can only be processed according to the computing resource applied for by the user.

According to some embodiments of the present disclosure, when it is determined that the resource description manifest indicates a request for the actual computing resource and the actual hardware configuration of the physical machine corresponding to the initial computing resource is higher than the computing resource specified by the user, the configuration of the initial computing resource is increased to the maximum available configuration supported by the corresponding physical machine. This achieves maximum utilization of the computing resources of the physical machine, which not only improves the performance in processing the user's job, but also improves the utilization ratio of the cloud computing resource.

Returning to FIG. 11, the third calling unit 665 is configured to call the initial computing resource to process the instances contained in the task when the number of processor cores of the physical machine is equal to that of the computing resource and the memory of the physical machine is equal to that of the computing resource.

In some embodiments, for any physical machine that receives instances, when it is determined that the actual hardware configuration of the physical machine is equal to the computing resource specified by the user in the resource description manifest, the initial computing resource generated in Step S337 is called to process the instance scheduled onto the physical machine.

In some embodiments, when it is determined that the actual hardware configuration of the physical machine is equal to the computing resource specified by the user in the resource description manifest, it indicates that the maximum available resource of the physical machine is equal to the minimum computing resource of the user. Therefore, the computing resource of the physical machine has been utilized fully.

According to embodiments of the present disclosure, when it is determined that the resource description manifest indicates a request for the actual computing resource and the actual hardware configuration of the physical machine corresponding to the initial computing resource is equal to the computing resource specified by the user, the configuration of the initial computing resource is the maximum available configuration supported by the corresponding physical machine. This realizes maximum utilization of the computing resource of the physical machine, and guaranteeing to make the best use of the cloud computing resource.

Figure 14:
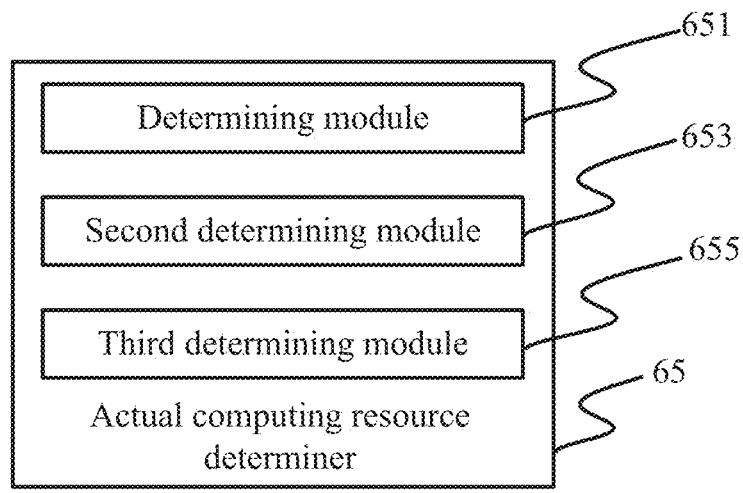
FIG. 14 is a diagram of an actual computing resource determiner unit, according to some embodiments of the disclosure.

FIG. 14 is a diagram of an actual computing resource determiner unit, according to some embodiments of the disclosure. As shown in FIG. 14, the actual computing resource determiner unit 65 may include a determining module 651, a second determining module 653 and a third determining module 655.

The determining module 651 is configured to determine whether the resource description manifest comprises resource auto-growth information.

In some embodiments, when the user generates a task on the client, an indication to call the actual computing resource is indicated by configuring the resource auto-growth information in the resource description manifest of the task. If the user does not need to call a resource in excess of the computing resource specified by the user to process the task, the user may only need not to configure the resource auto-growth information in the resource description manifest of the task.

Specifically, when it is determined whether the resource description manifest indicates a request for the actual computing resource in excess of the computing resource specified by the user, it is determined whether the resource auto-growth information may be read from the resource description manifest. The second determining module 653 is activated if the resource auto-growth information is read from the resource description manifest. The third determining module 655 is activated if the resource auto-growth information is not read from the resource description manifest.

The second determining module 653 is configured to determine whether the resource description manifest indicates a request for the actual computing resource when the resource description manifest contains the resource auto-growth information.

Specifically, when the resource description manifest contains the resource auto-growth information, it is determined that the user instructs a request for cloud computing resources in excess of the computing resource specified by the user in the resource description manifest to process the instance.

The third determining module 655 is configured to determine whether the resource description manifest does not indicate a request for the actual computing resource when the resource description manifest does not contain the resource auto-growth information.

Specifically, when the resource description manifest does not contain the resource auto-growth information, it is determined that the user does not need the cloud computing resource in excess of the computing resource specified in the resource description manifest. Thus, it is determined that the user instructs to process the instance according to the computing resource specified by the user in the resource description manifest.

Figure 15:
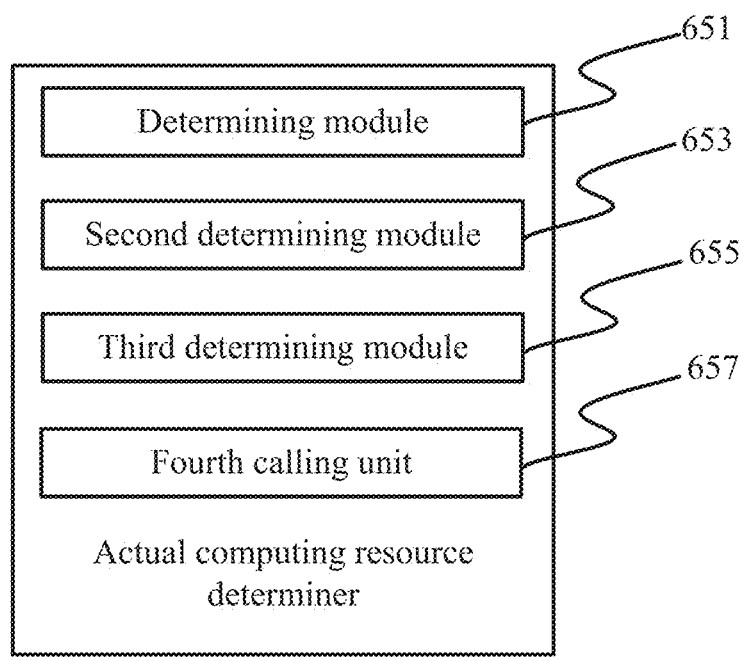
FIG. 15 is a diagram of an actual computing resource determiner, according to some embodiments of the disclosure.

FIG. 15 is a diagram of an actual computing resource determiner, according to some embodiments of the disclosure. In the embodiment illustrated in FIG. 15, the actual computing resource determiner may further include a fourth calling unit 657.

The fourth calling unit 657 is configured to call the initial computing resource to process the instance scheduled onto the corresponding physical machine after it is determined that the resource description manifest does not indicate a request for the actual computing resource.

Specifically, after it is determined that the resource description manifest does not indicate a request for the actual computing resource, the virtual machine serving as the initial computing resource is controlled to process the instance scheduled onto the corresponding physical machine according to the computing resource specified by the user in the resource description manifest.

According to some embodiments of the present disclosure, by means of the resource auto-growth information in the resource description manifest, the user may select whether to call computing resource higher than the required computing resource to process the task according to the computing needs, thereby improving the user experience.

In some embodiments, the scheduling device for processing task resources may be applied to a hardware environment constituted by a computer terminal 10 as shown in FIG. 1. As shown in FIG. 1, the computer terminal 10 is connected to other computer terminals through networks including, but not limited to Wide Area Network (WAN), Metropolitan Area Network (MAN) or Local Area Network (LAN).

Figure 16:
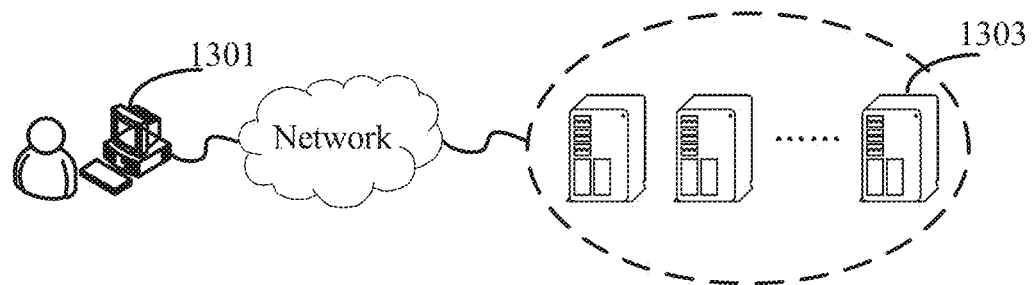
FIG. 16 is a diagram illustrating a scheduling system for processing task resources, according to some embodiments of the disclosure.

FIG. 16 is a diagram illustrating a scheduling system for processing task resources, according to some embodiments of the disclosure. As shown in FIG. 16, may include a client 1301 and a cloud computing resource 1303.

The client 1301 is configured to send at least one to-be-processed task to the cloud computing resource, wherein each of the tasks contains one or more instances and resource description manifest required for processing the instances contained in the task.

The cloud computing resource 1303 is connected to the client and is configured to determine an initial computing resource according to the resource description manifest, determine whether the resource description manifest indicates a request for utilizing an actual computing resource, and call the actual computing resource to process the instances contained in the task when the resource description manifest indicates a request for the actual computing resource. The initial computing resource is the minimum computing resource called for processing the instances contained in the task, and the actual computing resource is a computing resource in excess of the initial computing resource.

In some embodiments, the client may be an application program installed on a computer, a tablet computer, a notebook computer, and the like. A user may generate a to-be-processed job by logging into the client and according to a specific computing need, where a job contains at least one task, each task contains one or more instances, and each instance in each task calls the same computing resource which may be described through the resource description manifest.

In some embodiments, the resource description manifest may include at least an address of a program run by a task, an input/output path of data required for the program run, resource needs (such as CPUs, memory, and the like) and concurrency needs (namely, the quantity of instances contained in each task).

It is to be noted that the resource needs specified by the user in the resource description manifest include resources used as system overhead. For example, when the user's resource need is an 8-core CPU, where 2 cores may be used as the system overhead, the remaining 6 cores may be used for processing the instances contained in a user's job.

In following examples, an exemplary description is made regarding how many computing resources are reserved to be used as the system overhead, but this is not limiting to the present disclosure.

Specifically, after the at least one to-be-processed task sent by the client is received, for any task therein, the cloud computing resource determines, according to the resource description manifest contained in this task, the initial computing resource of the instances contained in the task. The initial computing resource is the minimum computing resource satisfying the resource description manifest contained in the task.

In some embodiments, the cloud computing resource reads, from the resource description manifest contained in a task, configuration information of computing resource required for processing the instances contained in the task, and screens, according to the configuration information, the computing resource whose configuration conforms to the configuration information as the initial computing resource.

Specifically, for any task among the received at least one to-be-processed task, after the initial computing resource configured to process the task is determined according to the resource description manifest of the task, it is determined whether the resource description manifest indicates a request for the actual computing resource in excess of the initial computing resource to process the task. The actual hardware configuration (for example, the number of CPU cores, memory, and the like, of a physical machine) of the physical machine corresponding to the initial computing resource may be greater than the configuration of the initial computing resource. The actual computing resource and the initial computing resource correspond to the same physical machine. The configuration of the actual computing resource is higher than that of the initial computing resource, but is not in excess of the actual hardware configuration of the physical machine.

In some embodiments, in order to improve the utilization ratio of the cloud computing resource, when the task is generated on the client, the user may specify whether the computing resource called for processing the task can grow dynamically according to the actual configuration supported by the cloud computing resource. Thus, the user may specify when the instances contained in the task run whether the actual resources occupied by the instances contained in the task may be greater than the computing resources specified by the user in the resource description manifest.

In some embodiments, after determining the initial computing resource configured to process the task according to the resource description manifest contained in the task, the cloud computing resource determines whether the resource description manifest indicates a request for the actual computing resource that can be supported by the physical machine corresponding to the initial computing resource to process the instances contained in the task.

Specifically, the actual computing resource in excess of the initial computing resource is called to process the instances contained in the task when it is determined that the resource description manifest indicates a request for the actual computing resource.

In some embodiments, after scheduling each instance contained in a task to the corresponding initial computing resource, the cloud computing resource automatically calls the actual computing resource in excess of the initial computing resource to run the instances contained in the task when the instances are executed when it is determined that the resource description manifest indicates a request for the actual computing resource. This avoids the problem in the prior art that cloud computing resources are wasted because the task is processed according to the user-specified resource needs, exempts the user from manually splitting a job according to different types of resource needs, realizes automatic processing the task according to the actual configuration of the cloud computing resource, improves the utilization ratio of the cloud computing resource, and further improves the efficiency in processing the tasks contained in the user's job.

According to the above embodiments of the present disclosure, if it is expected to make the best use of the heterogeneous cloud computing resource to process tasks contained in a user's job and to improve the efficiency of the heterogeneous cloud computing resource in processing a task, the minimum computing resource required for processing the task may be specified in the resource description manifest when the task is generated, and it is indicated whether actual computing resources in excess of the minimum computing resource may be called to process the task. After the heterogeneous cloud computing resource receives the task and determines each initial computing resource required for processing the task according to the resource description manifest of the task, this solution may automatically grow, according to the indication of the resource description manifest, the initial computing resource into the actual computing resource supported by a physical machine corresponding to the initial computing resource to call actual computing resource having higher configuration to process the instances contained in the task.

When the resource description manifest of the task is generated, the initial computing resource satisfying the minimum computing resource may be allocated to task instances according to the resource description manifest, and the actual computing resource having higher configuration supported by the physical machine corresponding to the initial computing resource may be called when the instances are executed only by specifying, in the resource description manifest, the minimum computing resource required for processing the instances contained in the task, and indicating, by means of the resource description manifest, for the cloud computing resource to call the actual computing resource in excess of the minimum computing resource to process the task instances. Therefore, by means of the solution provided by the present disclosure, a user may realize, without manually splitting a job according to different resource demand types, the automatic calling of the actual computing resource supported by the cloud computing resource to process the task instances. In this way, it is realized that a job may be defined only according to the user's computing needs without splitting, in consideration of specific resource configuration of the heterogeneous cloud computing resource, a job to adapt to the heterogeneous cloud computing resource. Furthermore, when the task instances are processed, if satisfying the user-specified minimum computing resource, the actual computing resource supported by the heterogeneous cloud computing resource may be automatically called. Thus, the heterogeneous cloud computing resources may be adaptively called to process the instances contained in the task, the utilization ratio of the heterogeneous cloud computing resource may be improved to quickly and efficiently process the user's job, and the performance in processing the user's job is improved.

Thus, the above embodiments of the present disclosure solve the technical problem that, in the prior art, when batch computing is conducted based on a heterogeneous cloud computing resource, the heterogeneous cloud computing resource is underutilized, which results in a low efficiency in processing the tasks contained in a user's job.

Some embodiments of the present disclosure may provide a computer terminal, which may be any computer terminal device in a computer terminal cluster. In some embodiments, the computer terminal may also be replaced by a terminal device such as a mobile terminal.

In some embodiments, the computer terminal may be positioned in at least one network device among multiple network devices of the computer network.

In some embodiments, the computer terminal may execute program codes of an application in a vulnerability detection method in the following steps: receiving at least one to-be-processed task sent by a client, wherein each of the tasks contains one or more instances and resource description manifest required for processing the instances contained in the task; determining an initial computing resource according to the resource description manifest, wherein the initial computing resource is the minimum computing resource called for processing the instances contained in the task; determining whether the resource description manifest indicates a request for utilizing an actual computing resource, wherein the actual computing resource is a computing resource in excess of the initial computing resource; and calling the actual computing resource to process the instances contained in the task when the resource description manifest indicates a request for the actual computing resource.

Figure 17:
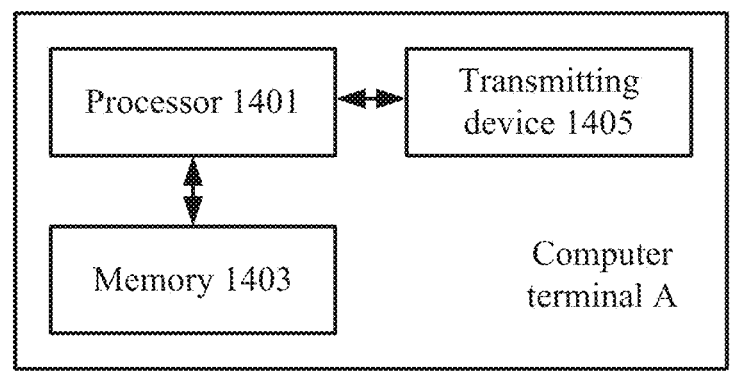
FIG. 17 is a diagram of a computer terminal according to some embodiments of the disclosure.

FIG. 17 is a diagram of a computer terminal according to the embodiments of the disclosure. As shown in FIG. 17, the computer terminal A may include one or more (only one is shown in the figure) processors 1401, a memory 1403 and a transmitting device 1405.

The memory may be configured to store software programs and modules, for example, program instructions/modules corresponding to the scheduling method and device for processing task resources in the embodiments of the present disclosure. By running the software programs and modules stored in the memory, the processors may execute various function applications and data processing routines realizing the scheduling method for processing task resources. The memory may include a high-speed random access memory, or include a non-volatile memory such as one or more magnetic memory devices, flash memory devices or other non-volatile solid state memory devices. In some embodiments, the memory may further include some memory devices disposed remotely relative to the processors, and these remote memory devices may be connected to the computer terminal A through the network. Instances of the network includes, but is not limited to the Internet, an intranet, a local area network (LAN), a mobile communication network and a combination thereof.

The processors may call, by means of the transmitting device, information stored in the memory and applications to execute the following steps: receiving at least one to-be-processed task sent by the client, wherein each of the tasks contains one or more instances and resource description manifest required for processing the instances contained in the task; and determining an initial computing resource according to the resource description manifest, wherein the initial computing resource is the minimum computing resource called for processing the instances contained in the task. The steps further include: determining whether the resource description manifest indicates a request for utilizing an actual computing resource, wherein the actual computing resource is a computing resource in excess of the initial computing resource; and calling the actual computing resource to process the instances contained in the task when the resource description manifest indicates a request for the actual computing resource.

In some embodiments, the processors may also execute program codes in the following steps: screening, from the cloud computing resources, to obtain configuration information of a physical machine cluster satisfying a preset condition, wherein the configuration information of the physical machine cluster includes at least the number of processor cores of any physical machine in the physical machine cluster and the memory of the physical machine, the number of processor cores of the physical machine being greater than or equal to that of the computing resource, and the memory of the physical machine being greater than or equal to that of the computing resource; determining, from the cloud computing resource, the physical machine cluster corresponding to the configuration information of the physical machine cluster, wherein the quantity of the physical machines contained in the physical machine cluster conforms with that of the computing resource; and controlling the corresponding physical machine to generate a virtual machine serving as the initial computing resource. The configuration information of the virtual machine includes at least the number of processor cores and a memory of the virtual machine, the number of processor cores of the virtual machine conforms to that of the computing resource, and the memory of the virtual machine conforms to that of the computing resource.

In some embodiments, the processors may also execute program codes in the following steps: determining whether the number of processor cores of the physical machine is greater than that of the computing resource, and whether the memory of the physical machine is greater than that of the computing resource; calling the actual computing resource in excess of the initial computing resource to process the instances contained in the task when the number of processor cores of the physical machine is greater than that of the computing resource, or the memory of the physical machine is greater than that of the computing resource; and calling the initial computing resource to process the instances contained in the task when the number of processor cores of the physical machine is equal to that of the computing resource and the memory of the physical machine is equal to that of the computing resource.

In some embodiments, the processors may also execute program codes in the following steps: increasing the number of processor cores of the virtual machine and the memory of the virtual machine to obtain the actual computing resource;

and calling the actual computing resource to process the instances scheduled onto the corresponding physical machine.

In some embodiments, the processors may also execute program codes in the following steps: increasing the number of processor cores of the virtual machine to a maximum available number of processor cores supported by the corresponding physical machine, and increasing the memory of the virtual machine to a maximum available memory supported by the corresponding physical machine.

In some embodiments, the processors may also execute program codes in the following steps: determining whether the resource description manifest contains resource auto-growth information; determining that the resource description manifest indicates a request for the actual computing resource when the resource description manifest contains the resource auto-growth information; and determining that the resource description manifest does not indicate a request for the actual computing resource when the resource description manifest does not contain the resource auto-growth information.

In some embodiments, the processors may also execute program codes in the following steps: calling the initial computing resource to process the instances scheduled onto the corresponding physical machine.

In some of the embodiments of the present disclosure, if it is expected to make the best use of the heterogeneous cloud computing resource to process tasks contained in a user's job and to improve the efficiency of the heterogeneous cloud computing resource in processing a task, the minimum computing resource required for processing the task may be specified in the resource description manifest when the task is generated, and it is indicated that the actual computing resource in excess of the minimum computing resource may be called to process the task. After the heterogeneous cloud computing resource receives the task and determines each initial computing resource required for processing the task according to the resource description manifest of the task, this solution may automatically grow, according to the indication of the resource description manifest, the initial computing resource into the actual computing resource supported by a physical machine corresponding to the initial computing resource to call the actual computing resource, having excess capacity, to process the instances contained in the task.

When the resource description manifest of the task is generated, the initial computing resource satisfying the minimum computing resource may be allocated to task instances according to the resource description manifest, and the actual computing resource having excess capacity supported by the physical machine corresponding to the initial computing resource may be called when the instances are executed only by specifying, in the resource description manifest, the minimum computing resource required for processing the instances contained in the task, and indicating, by means of the resource description manifest, for the cloud computing resource to call the actual computing resource in excess of the minimum computing resource to process the task instances. Therefore, by means of the solution provided by the embodiments of the present disclosure, a user may realize, without manually splitting a job according to different resource demand types, the automatic calling of the actual computing resource supported by the cloud computing resource to process the task instances. In this way, it is realized that a job may be defined only according to the user's computing needs without splitting, in consideration of specific resource configuration of the heterogeneous cloud computing resource, a job to adapt to the heterogeneous cloud computing resource. Furthermore, when the task instances are processed, if satisfying the user-specified minimum computing resource, the actual computing resource supported by the heterogeneous cloud computing resource may be automatically called. Thus the heterogeneous cloud computing resources may be adaptively called to process the instances contained in the task, the utilization ratio of the heterogeneous cloud computing resource may be improved to quickly and efficiently process the user's job, and the performance in processing the user's job is improved.

The embodiments provided by the present disclosure solve the technical problem that, in the prior art, when batch computing is conducted based on a heterogeneous cloud computing resource, the heterogeneous cloud computing resource is underutilized, which results in a low efficiency in processing tasks contained in a user's job.

Those of ordinary skill in the art may understand that the structure as shown in FIG. 17 is exemplary and explanatory only, and the computer terminal may be a smart mobile phone (such as an Android mobile phone, or an IOS mobile phone, and the like), a tablet computer, a palm computer and terminal devices such as mobile Internet devices (MID) or PAD, etc. FIG. 17 does not limit the structures of the electronic devices. For example, the computer terminal A may further include more or less components (such as network interfaces, display devices, and the like) than as shown in FIG. 17, or have a configuration different from as shown in FIG. 17.

Those of ordinary skill in the art may understand that all or some of the steps in the embodiments may be realized by program instructing terminal devices related hardware. The program may be stored in a computer-readable storage medium, and the storage medium may comprise: a flash disk, a read-only memory (ROM), a random access memory (RAM), a magnetic disk, or an optical disc, etc.

The embodiments of the present disclosure further provide a non-transitory computer readable storage medium. In some embodiments, the storage medium may be configured to save a program code executed by the scheduling method for processing task resources provided by embodiments described above.

In some embodiments, the storage medium may be positioned in any computer terminal of a computer terminal cluster in a computer network, or positioned in any mobile terminal of a mobile terminal cluster.

In some embodiments, the storage medium is configured to store the program code for executing the following steps: receiving at least one to-be-processed task sent by a client, wherein each of the tasks contains one or more instances and resource description manifest required for processing the instances contained in the task; and determining an initial computing resource according to the resource description manifest, wherein the initial computing resource is the minimum computing resource called for processing the instances contained in the task. The steps further include: determining whether the resource description manifest indicates a request for actual computing resource, wherein the actual computing resource is a computing resource in excess of the initial computing resource; and calling the actual computing resource to process the instances contained in the task when the resource description manifest indicates a request for the actual computing resource.

In some embodiments, the storage medium is configured to store the program code for executing the following steps: screening, from the cloud computing resource, to obtain configuration information of a physical machine cluster satisfying a preset condition, wherein the configuration information of the physical machine cluster includes at least the number of processor cores of any physical machine in the physical machine cluster and the memory of the physical machine, the number of processor cores of the physical machine being greater than or equal to that of the computing resource, and the memory of the physical machine being greater than or equal to that of the computing resource; determining, from the cloud computing resource, the physical machine cluster corresponding to the configuration information of the physical machine cluster, wherein the quantity of the physical machines contained in the physical machine cluster conforms with that of the computing resource; and controlling the corresponding physical machine to generate a virtual machine serving as the initial computing resource, wherein the configuration information of the virtual machine includes at least the number of processor cores and a memory of the virtual machine, the number of processor cores of the virtual machine conforms with that of the computing resource, and the memory of the virtual machine conforms with that of the computing resource.

In some embodiments, the storage medium is configured to store the program code for executing the following steps: determining whether the number of processor cores of the physical machine is greater than that of the computing resource, and whether the memory of the physical machine is greater than that of the computing resource; calling the actual computing resource greater than the initial computing resource to process the instances contained in the task when the number of processor cores of the physical machine is greater than that of the computing resource, or the memory of the physical machine is greater than that of the computing resource; or calling the initial computing resource to process the instances contained in the task when the number of processor cores of the physical machine is equal to that of the computing resource, and the memory of the physical machine is equal to that of the computing resource.

In some embodiments, the storage medium is further configured to store the program code for executing the following steps: increasing the number of processor cores of the virtual machine and the memory of the virtual machine to obtain the actual computing resource; and calling the actual computing resource to process the instances scheduled onto the corresponding physical machine.

In some embodiments, the storage medium is further configured to store the program code for executing the following steps: increasing the number of processor cores of the virtual machine to a maximum available number of processor cores supported by the corresponding physical machine, and increasing the memory of the virtual machine to a maximum available memory supported by the corresponding physical machine.

In some embodiments, the storage medium is further configured to store the program code for executing the following steps: determining whether the resource description manifest contains resource auto-growth information; determining that the resource description manifest indicates a request for the actual computing resource when the resource description manifest contains the resource auto-growth information; or determining that the resource description manifest does not indicate a request for the actual computing resource when the resource description manifest does not contain the resource auto-growth information.

In some embodiments, the storage medium is further configured to store the program code for executing the following steps: calling the initial computing resource to process the instances scheduled onto the corresponding physical machine.

Sequential numbers of the embodiments of the present disclosure are merely for description, and do not represent advantages or disadvantages of the embodiments.

Among embodiments of the present disclosure, description of each embodiment may be focused on in a different manner, and parts not expatiated on in a one embodiment may be referred to in a related description in other embodiments.

From the several embodiments provided in the present disclosure, it should be understood that the disclosed technical contents may be realized in other ways. The device embodiments described above are merely exemplary. For example, a unit partition is merely a logic functional partition. In actual realization, additional manners of partitioning may be available. For example, multiple units or components may be combined or integrated into another system, or some features may be ignored and not executed. Further, intercoupling, direct coupling, or communication connection displayed or discussed may be done through some interfaces, and indirect coupling or communication connection of units or modules may be electrical or in other forms.

The unit serving as a detached component may be or may not be physically detached, the component serving as a unit display may be or may not be a physical unit; that is, either located in one place or distributed on a plurality of network elements. Units may be selected in part or in whole according to actual needs for achieving the objectives of the solution of this embodiment.

In addition, various functional units in various embodiments of the disclosure may be integrated into one processing unit, or various units may be separately or physically existent, or two or more units may be integrated into one unit. The integrated units may either be realized in the form of hardware or be realized in the form of software function units, or in a combination thereof.

The integrated units may be stored in a computer-readable storage medium if they are realized in the form of software function units and are sold or used as independent products. On the basis of such an understanding, the technical solution of the present disclosure, in essence, encompasses all or a part of the technical solution in the form of software products, which may be stored in a storage medium, including instructions to cause a computer device (a personal computer, a server, a network device, or the like) to execute all or a part of the steps of the above-mentioned method in the embodiments of the present disclosure. The aforementioned storage medium comprises: a USB flash disk, a read-only memory (ROM), a random access memory (RAM), a mobile hard disk, a magnetic disk or an optical disk and other media capable of storing a program code.

For the purposes of this disclosure a module and unit is a software, hardware, or firmware (or combinations thereof) system, process or functionality, or component thereof, that performs or facilitates the processes, features, and/or functions described herein (with or without human interaction or augmentation). A module can include sub-modules; and a unit can comprise a sub-unit. Software components of a module/unit may be stored on a computer readable medium for execution by a processor. Modules/units may be integral to one or more servers or devices, or be loaded and executed by one or more servers/devices. One or more modules may be grouped into an engine or an application.

Described above are preferred embodiments of the disclosure. It should be pointed out that to those of ordinary skill in the art, various improvements and embellishments may be made without departing from the principle of the present disclosure, and these improvements and embellishments are also deemed to be within the scope of protection of the present disclosure.

What is claimed is:

1. A method for automatically allocating actual computing resources in excess of an initial computing resource allocation by a cloud computing resource, the method comprising:
   receiving, by a cloud computing resource, a batch computing task from a client, the batch computing task associated with a batch computing program to execute on the cloud computing resource and including a plurality of instances and a resource description manifest representing resource needs of the batch computing task;
   determining, by the cloud computing resource, an initial computing resource allocation of a cluster of machines based on the resource description manifest, the initial computing resource allocation comprising a minimum computing resource satisfying the resource description manifest screened from a set of computing resources managed by the cloud computing resource;
   determining, by the cloud computing resource, whether the resource description manifest includes a configuration item;
   in response to the configuration item is activated, identifying, by the cloud computing resource, an actual computing resource allocation in excess of the initial computing resource allocation;
   before allocating the plurality of instances, configuring, by the cloud computing resource, the plurality of actual computing resources to process the plurality of instances prior to executing the plurality of instances, the plurality of actual computing resources configured to utilize resources in excess of the initial computing resource allocation, the configuring of the plurality of actual computing resources comprising increasing a number of processor cores of the actual computing resources to a number no more than a maximum available number of processor cores supported by corresponding physical machines and the amount of memory of the actual computing resources to a maximum available memory supported by the corresponding physical machine; and
   executing, by the cloud computing resource, the plurality of instances using the plurality of actual computing resources.

2. The method of claim 1, wherein the determining an initial computing resource allocation comprises:
   screening, by the cloud computing resource, the cluster of machines to identify a screened machine cluster, wherein the screened machine cluster includes one or more physical machines satisfying the initial computing resource allocation;
   scheduling, by the cloud computing resource, each of the plurality of instances to a physical machine in the screened machine cluster; and
   configuring, by the cloud computing resource, for each of the physical machines in the screened machine cluster, a virtual machine based on the initial computing resource allocation if one of the plurality of instances is scheduled to the physical machine.

3. The method of claim 2, wherein configuring, for each of the physical machines in the screened machine cluster, a virtual machine based on the initial computing resource allocation comprises:
   determining, by the cloud computing resource, for each physical machine in the screened machine cluster, whether the number of processor cores of the physical machine is greater than that of the initial computing resource allocation and whether the amount of memory of the physical machine is greater than that of the initial computing resource allocation;
   configuring, by the cloud computing resource, for each of the physical machines in the screened machine cluster, a virtual machine to utilize an actual computing resource allocation when it is determined that the number of processor cores of the physical machine is greater than that of the initial computing resource allocation or that the memory of the physical machine is greater than that of the initial computing resource allocation; and
   configuring, by the cloud computing resource, for each of the physical machines in the screened machine cluster, a virtual machine to utilize the initial computing resource allocation when it is determined that the number of processor cores of the physical machine is equal to that of the computing resource and the memory of the physical machine is equal to that of the computing resource.

4. The method of claim 3, wherein configuring a virtual machine to utilize an actual computing resource allocation comprises increasing, by the cloud computing resource, the number of processor cores of the virtual machine to a maximum available number of processor cores supported by the corresponding physical machine and the amount of memory of the virtual machine to a maximum available memory supported by the corresponding physical machine.

5. The method of claim 2 wherein configuring, for each of the physical machines in the screened machine cluster, a virtual machine based on the initial computing resource allocation comprises configuring, by the cloud computing resource, a single virtual machine on the physical machine.

6. The method of claim 1, wherein determining that the resource description manifest indicates a request to utilize an actual computing resource allocation in excess of the initial computing resource allocation comprises:
   determining, by the cloud computing resource, whether the resource description manifest contains resource auto-growth information;
   determining, by the cloud computing resource, that the resource description manifest contains a request for utilizing an actual computing resource allocation if the resource description manifest contains the resource auto-growth information; and
   determining, by the cloud computing resource, that the resource description manifest does not indicate a request for utilizing an actual computing resource allocation if the resource description manifest does not contain the resource auto-growth information.

7. The method of claim 1 wherein the resource description manifest includes an address of a program run by the batch computing task, an input path for a program, an output path for the program, CPU needs of the batch computing task, memory needs of the batch computing task, a number of instances, and resource auto-growth information.

8. A system for automatically allocating an actual computing resource in excess of an initial computing resource by a cloud computing resource, the system comprising:
   one or more processors;
   a network interface; and a non-transitory memory storing computer-executable instructions executable by the one or more processors, the instructions causing the system to:
receive, by the processor, a batch computing task from a client, the batch computing task associated with a batch computing program to execute on the cloud computing resource and including a plurality of instances and a resource description manifest representing resource needs of the batch computing task;
determine, by the processor, an initial computing resource allocation of a cluster of machines based on the resource description manifest, the initial computing resource allocation comprising a minimum computing resource satisfying the resource description manifest screened from a set of computing resources managed by the cloud computing resource;
determine, by the cloud computing resource, whether the resource description manifest includes a configuration item;
in response to the configuration item is activated, identify, by the processor, an actual computing resource allocation in excess of the initial computing resource allocation;
before allocating the plurality of instances, configure, by the processor, a plurality of actual computing resources to process the plurality of instances prior to executing the plurality of instances, the plurality of actual computing resources configured to utilize resources in excess of the initial computing resource allocation, the configuring of the plurality of actual computing resources comprising increasing a number of processor cores of the actual computing resources to a number not more than a maximum available number of processor cores supported by corresponding physical machines and the amount of memory of the actual computing resources to a maximum available memory supported by the corresponding physical machine; and
execute, by the processor, the plurality of instances using the plurality of actual computing resources.

9. The system of claim 8, wherein the instructions to determine an initial computing resource allocation further cause the system to:
screen, by the processor, the cluster of machines to identify a screened machine cluster, wherein the screened machine cluster includes one or more physical machines satisfying the initial computing resource allocation;
schedule, by the processor, each of the plurality of instances to a physical machine in the screened machine cluster; and
configure, by the processor, for each of the physical machines in the screened machine cluster, a virtual machine based on the initial computing resource allocation if one of the plurality of instances is scheduled to the physical machine.

10. The system of claim 9, wherein the instructions to configure, for each of the physical machines in the screened machine cluster, a virtual machine based on the initial computing resource allocation further cause the system to:
determine, by the processor, for each physical machine in the screened machine cluster, whether the number of processor cores of the physical machine is greater than that of the initial computing resource allocation and whether the amount of memory of the physical machine is greater than that of the initial computing resource allocation;
configure, by the processor, for each of the physical machines in the screened machine cluster, a virtual machine to utilize an actual computing resource allocation when it is determined that the number of processor cores of the physical machine is greater than that of the initial computing resource allocation or that the memory of the physical machine is greater than that of the initial computing resource allocation; and
configure, by the processor, for each of the physical machines in the screened machine cluster, a virtual machine to utilize the initial computing resource allocation when it is determined that the number of processor cores of the physical machine is equal to that of the computing resource and the memory of the physical machine is equal to that of the computing resource.

11. The system of claim 10, wherein the instructions to configure a virtual machine to utilize an actual computing resource allocation further cause the system to: increase, by the processor, the number of processor cores of the virtual machine to a maximum available number of processor cores supported by the corresponding physical machine and the amount of memory of the virtual machine to a maximum available memory supported by the corresponding physical machine.

12. The system of claim 9, wherein the instructions to configure, for each of the physical machines in the screened machine cluster, a virtual machine based on the initial computing resource allocation further cause the system to: configure, by the processor, a single virtual machine on the physical machine.

13. The system of claim 8, wherein the instructions to determine that the resource description manifest indicates a request to utilize an actual computing resource allocation in excess of the initial computing resource allocation further cause the system to
determine, by the processor, whether the resource description manifest contains resource auto-growth information;
determine, by the processor, that the resource description manifest contains a request for utilizing an actual computing resource allocation if the resource description manifest contains the resource auto-growth information; and
determine, by the processor, that the resource description manifest does not indicate a request for utilizing an actual computing resource allocation if the resource description manifest does not contain the resource auto-growth information.

14. The system of claim 8 wherein the resource description manifest includes an address of a program run by the batch computing task, an input path for a program, an output path for the program, CPU needs of the batch computing task, memory needs of the batch computing task, a number of instances, and resource auto-growth information.

15. A tangible, non-transitory computer-readable medium storing instructions that, when executed by a computing device coupled to the Internet, cause the computing device to:
receive a batch computing task from a client, the batch computing task associated with a batch computing program to execute on the cloud computing resource and including a plurality of instances and a resource description manifest representing resource needs of the batch computing task;
determine an initial computing resource allocation of a cluster of machines based on the resource description manifest, the initial computing resource allocation comprising a minimum computing resource satisfying the resource description manifest screened from a set of computing resources managed by the cloud computing resource;

determine, by the cloud computing resource, whether the resource description manifest includes a configuration item;

in response to the configuration item is activated, identify an actual computing resource allocation in excess of the initial computing resource allocation;

before allocating the plurality of instances, configure a plurality of actual computing resources to process the plurality of instances prior to executing the plurality of instances, the plurality of actual computing resources configured to utilize resources in excess of the initial computing resource allocation, the configuring of the plurality of actual computing resources comprising increasing a number of processor cores of the actual computing resources to a number no more than a maximum available number of processor cores supported by corresponding physical machines and the amount of memory of the actual computing resources to a maximum available memory supported by the corresponding physical machine; and execute the plurality of instances using the plurality of actual computing resources.

16. The computer-readable medium of claim 15 wherein the medium further stores instructions for causing the computing device to:

screen the cluster of machines to identify a screened machine cluster, wherein the screened machine cluster includes one or more physical machines satisfying the initial computing resource allocation;

schedule each of the plurality of instances to a physical machine in the screened machine cluster; and configure, for each of the physical machines in the screened machine cluster, a virtual machine based on the initial computing resource allocation if one of the plurality of instances is scheduled to the physical machine.

17. The computer-readable medium of claim 16 wherein the instructions for configuring, for each of the physical machines in the screened machine cluster, a virtual machine based on the initial computing resource allocation further causes the computing device to:

determine for each physical machine in the screened machine cluster, whether the number of processor cores of the physical machine is greater than that of the initial computing resource allocation and whether the amount of memory of the physical machine is greater than that of the initial computing resource allocation;

configure for each of the physical machines in the screened machine cluster, a virtual machine to utilize an actual computing resource allocation when it is determined that the number of processor cores of the physical machine is greater than that of the initial computing resource allocation or that the memory of the physical machine is greater than that of the initial computing resource allocation; and configure for each of the physical machines in the screened machine cluster, a virtual machine to utilize the initial computing resource allocation when it is determined that the number of processor cores of the physical machine is equal to that of the computing resource and the memory of the physical machine is equal to that of the computing resource.

18. The computer-readable medium of claim 17 wherein the instructions for configuring a virtual machine to utilize an actual computing resource allocation further causes the computing device to increase the number of processor cores of the virtual machine to a maximum available number of processor cores supported by the corresponding physical machine and the amount of memory of the virtual machine to a maximum available memory supported by the corresponding physical machine.

19. The computer-readable medium of claim 16 wherein the instructions for configuring, for each of the physical machines in the screened machine cluster, a virtual machine based on the initial computing resource allocation further causes the computing device to configure a single virtual machine on the physical machine.

20. The computer-readable medium of claim 15 wherein the instructions for determining that the resource description manifest indicates a request to utilize an actual computing resource allocation in excess of the initial computing resource allocation further causes the computing device to:

determine whether the resource description manifest contains resource auto-growth information;

determine that the resource description manifest contains a request for utilizing an actual computing resource allocation if the resource description manifest contains the resource auto-growth information; and determine that the resource description manifest does not indicate a request for utilizing an actual computing resource allocation if the resource description manifest does not contain the resource auto-growth information.

* * * * *